US012579664B2

(12) United States Patent (10) Patent No.: US 12,579,664 B2
Shin et al. (45) Date of Patent: Mar. 17, 2026

(54) EYE TRACKING METHOD, APPARATUS AND SENSOR FOR DETERMINING SENSING COVERAGE BASED ON EYE MODEL

(71) Applicant: SAMSUNG ELECTRONICS CO., LTD., Suwon-si (KR)

(72) Inventors: Sunghwan Shin, Suwon-si (KR); Bonkon Koo, Suwon-si (KR); Doyoun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 454 days.

(21) Appl. No.: 18/084,084

(22) Filed: Dec. 19, 2022

(65) Prior Publication Data

US 2023/0206474 A1 Jun. 29, 2023

Related U.S. Application Data

(63) Continuation of application No. PCT/KR2022/019737, filed on Dec. 6, 2022.

(30) Foreign Application Priority Data

Dec. 29, 2021 (KR) ........................ 10-2021-0191799

(51) Int. Cl.
*G06T 7/246* (2017.01)
*G06V 10/44* (2022.01)
*G06V 40/18* (2022.01)

(52) U.S. Cl.
CPC .............. *G06T 7/251* (2017.01); *G06V 10/44* (2022.01); *G06V 40/193* (2022.01); *G06T 2207/30041* (2013.01)

(58) Field of Classification Search
None
See application file for complete search history.

(56) References Cited

U.S. PATENT DOCUMENTS

| 5,797,046 A | 8/1998 | Nagano et al. |
| 5,983,029 A | 11/1999 | Yamada et al. |
| | (Continued) | |

FOREIGN PATENT DOCUMENTS

| CN | 112578558 A | 3/2021 |
| JP | 8-194154 A | 7/1996 |
| | (Continued) | |

OTHER PUBLICATIONS

International Search Report & Written Opinion (PCT/ISA/210 & 237) issued Mar. 16, 2023 from the International Searching Authority in International Application No. PCT/KR2022/019737.

(Continued)

*Primary Examiner* — Yanna Wu
(74) *Attorney, Agent, or Firm* — Sughrue Mion, PLLC

(57) ABSTRACT

A method of determining a sensing region of a gaze tracking sensor may include obtaining first eyeball data from a first sensing region. According to an embodiment of the disclosure, a method of determining a sensing region of a gaze tracking sensor may include obtaining an eye model, based on the obtained first eyeball data. According to an embodiment of the disclosure, a method of determining a sensing region of a gaze tracking sensor may include determining a second sensing region, based on the obtained eye model.

17 Claims, 22 Drawing Sheets

(56) References Cited

U.S. PATENT DOCUMENTS

| | | | |
|---|---|---|---|
| 9,465,990 B2 | 10/2016 | Ronnecke et al. | |
| 10,109,067 B2 | 10/2018 | Hunt et al. | |
| 10,268,290 B2 | 4/2019 | Trail et al. | |
| 10,594,974 B2 | 3/2020 | Ivarsson et al. | |
| 10,614,577 B1 | 4/2020 | Cavin et al. | |
| 10,878,594 B1 * | 12/2020 | Cavin | G06F 3/013 |
| 2011/0228975 A1 * | 9/2011 | Hennessey | G06F 3/013 |
| | | | 382/103 |
| 2014/0098198 A1 | 4/2014 | Lee et al. | |
| 2014/0313308 A1 | 10/2014 | Wang et al. | |
| 2016/0198091 A1 * | 7/2016 | Edwards | G06F 1/3206 |
| | | | 348/78 |
| 2017/0118405 A1 | 4/2017 | Song | |
| 2021/0124416 A1 | 4/2021 | Sarkar et al. | |
| 2021/0255698 A1 | 8/2021 | Rana et al. | |

FOREIGN PATENT DOCUMENTS

| | | | |
|---|---|---|---|
| JP | 2002-112966 A | | 4/2002 |
| JP | 2002-301032 A | | 10/2002 |
| JP | 3812298 B2 | | 8/2006 |
| JP | 4696571 B2 | | 6/2011 |
| KR | 10-2013-0043366 A | | 4/2013 |
| KR | 10-2014-0045873 A | | 4/2014 |
| KR | 10-2014-0125713 A | | 10/2014 |
| KR | 10-2017-0046413 A | | 5/2017 |
| KR | 10-2021-0104107 A | | 8/2021 |

OTHER PUBLICATIONS

Communication issued Dec. 23, 2024 by the European Patent Office in European Patent Application No. 22916504.8.

* cited by examiner

FRAME

IR DETECTOR

100

200

300

X GLINT FEATURE POINT

IR PUPIL DETECTOR

IR SCANNER

X GLINT FEATURE POINT

EYE TRACKING METHOD, APPARATUS AND SENSOR FOR DETERMINING SENSING COVERAGE BASED ON EYE MODEL

CROSS-REFERENCE TO RELATED APPLICATIONS

This application is a bypass continuation of International Application No. PCT/KR2022/019737, filed on Dec. 6, 2022, which claims priority to Korean Patent Application No. 10-2021-0191799, filed on Dec. 29, 2021, in the Korean Intellectual Property Office, the disclosures of which are incorporated by reference herein in their entireties.

BACKGROUND

1. Field

The disclosure relates to a gaze tracking device and method for detecting the gaze of a user, and more particularly, a device and method of determining a gaze tracking sensing region for detecting the gaze of a user by using a light emitter and a light receiver of a gaze tracking sensor.

2. Description of Related Art

Eye tracking or gaze tracking is technology for tracking a person's eye movement. Through eye tracking or gaze tracking, it is possible to determine what a user is looking at or focusing on.

Recently, results of tracking the eyes of consumers who are watching advertisements are analyzed, and the analyzed results are utilized for marketing, and as such, the eyes are being used as a new user interface (UI). For example, when a user's eye direction and a command are pre-mapped and a predetermined gaze input is obtained, an electronic device including a gaze tracking sensor may operate to execute a corresponding command. For example, when it is determined that the user of a smartphone is gazing in a downward direction of the smartphone, the smartphone may perform an operation of scrolling the screen downward.

A UI using gaze tracking technology is widely used in augmented reality (AR) devices. AR is a technology for overlaying a virtual image on a physical environment space of the real world or on a real world object, so as to be displayed as a single image. An AR device which is worn on the face or head of a user allows the user to see a real scene and a virtual image together through a glasses-type apparatus using a see-through display such as a waveguide, the glasses-type apparatus being provided in front of the eyes of the user. As research into AR devices is being actively conducted, various types of wearable devices are being released or are expected to be released. Wearable AR devices can interact with a user without a separate joystick or hardware for recognizing a gesture, by using gaze tracking information, such as continuous gaze, eye blinking, or gaze in a specific direction, as a UI.

A gaze tracking device determines a sensing region, based on sensing data obtained by sensing a user's eye in a maximum range supportable by hardware, and performs gaze tracking in the determined sensing region. The sensing region does not change during gaze tracking, and when gaze tracking fails, the user's eye is sensed again within the maximum range supportable by the hardware, and the sensing region is determined again to perform gaze tracking.

In other words, gaze tracking and sensing coverage determination may not be performed at the same time and gaze tracking needs to be stopped to determine sensing coverage. Also, even when the position of an eyeball moves due to slippage of the gaze tracking device, a gaze tracking sensor emits light for gaze tracking in fixed sensing coverage.

SUMMARY

According to an embodiment of the disclosure, a method of determining a sensing region of a gaze tracking sensor may include obtaining first eyeball data from a first sensing region. According to an embodiment of the disclosure, a method of determining a sensing region of a gaze tracking sensor may include obtaining an eye model, based on the obtained first eyeball data. According to an embodiment of the disclosure, a method of determining a sensing region of a gaze tracking sensor may include determining a second sensing region, based on the obtained eye model.

According to an embodiment of the disclosure, a gaze tracking sensor may include at least one light emitter and at least one light receiver, wherein the at least one light receiver obtains first eyeball data, based on light received after being reflected by the eyeball among light emitted by the at least one light emitter to a first sensing region. According to an embodiment of the disclosure, a gaze tracking sensor may include at least one light emitter and at least one light receiver, wherein the at least one light emitter emits light to a second sensing region determined based on an eye model obtained based on the obtained first eyeball data.

According to an embodiment of the disclosure, a gaze tracking device may include at least one sensor comprising a light emitter and a light receiver; a storage storing a program including at least one instruction; and at least one processor configured to execute the at least one instruction stored in the storage, wherein the at least one processor executes the at least one instruction to obtain first eyeball data from a first sensing region by using the at least one sensor. According to an embodiment of the disclosure, a gaze tracking device may include at least one sensor comprising a light emitter and a light receiver; a storage storing a program including at least one instruction; and at least one processor configured to execute the at least one instruction stored in the storage, wherein the at least one processor executes the at least one instruction to obtain an eye model, based on the obtained first eyeball data. According to an embodiment of the disclosure, a gaze tracking device may include at least one sensor comprising a light emitter and a light receiver; a storage storing a program including at least one instruction; and at least one processor configured to execute the at least one instruction stored in the storage, wherein the at least one processor executes the at least one instruction to determine a second sensing region, based on the obtained eye model.

According to an embodiment of the disclosure, a non-transitory computer-readable recording medium has recorded thereon a computer program for performing the above-described method.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
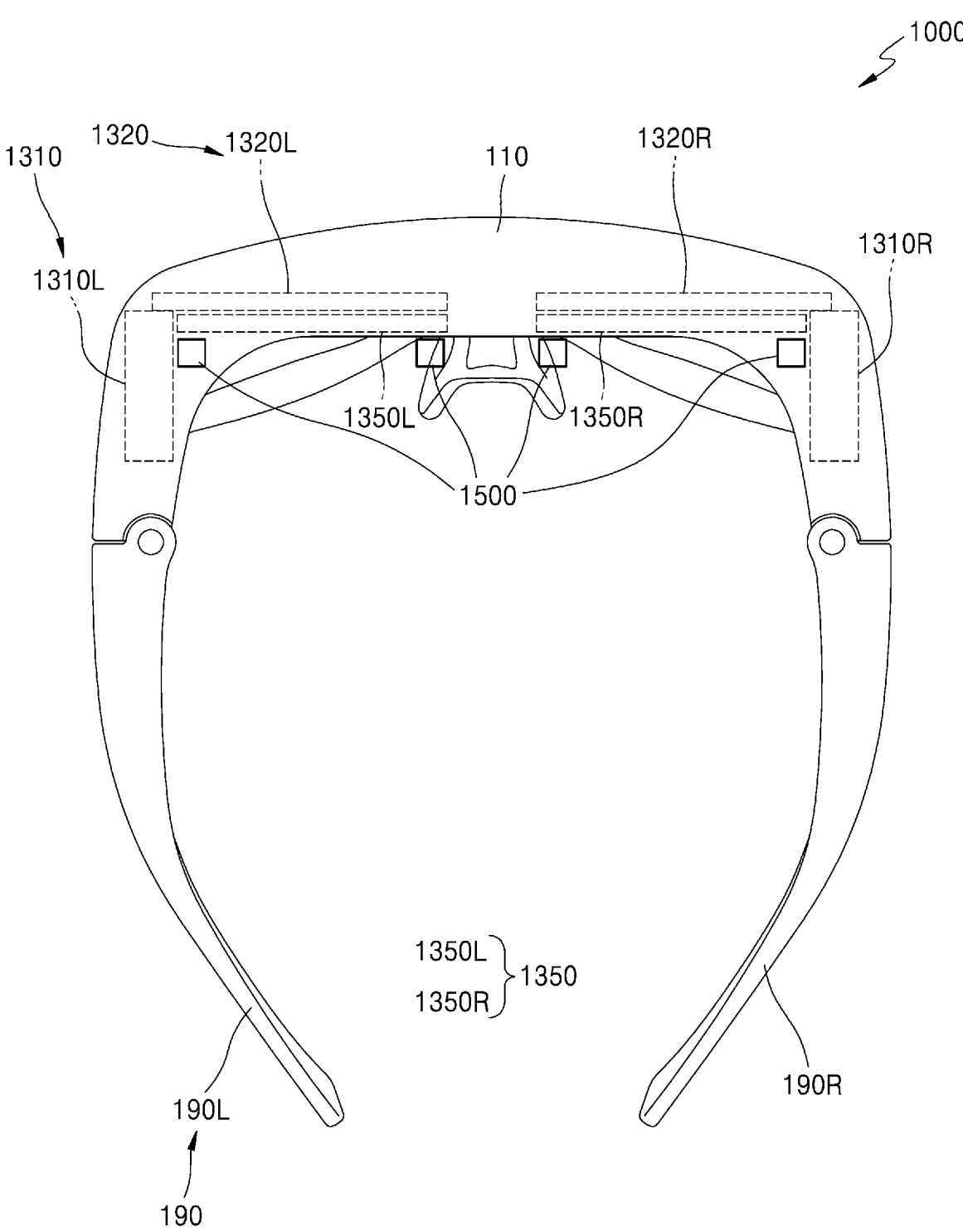
FIG. 1 is a view illustrating a gaze tracking device according to an example embodiment of the disclosure.

Throughout the disclosure, the expression "at least one of a, b or c" indicates only a, only b, only c, both a and b, both a and c, both b and c, or all of a, b, and c.

Embodiments of the disclosure will now be described more fully with reference to the accompanying drawings such that one of ordinary skill in the art to which the disclosure pertains may easily execute the disclosure. The disclosure may, however, be embodied in many different forms and should not be construed as being limited to the embodiments set forth herein. In the drawings, parts irrelevant to the description are omitted for the simplicity of explanation, and like numbers refer to like elements throughout.

Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

As used herein, 'augmented reality (AR)' refers to a technology for displaying a virtual image on a physical environment space of the real world or displaying a real world object and a virtual image together.

An 'AR device' is a device capable of implementing 'augmented reality', and generally includes not only AR glasses which are worn on the face of a user but also a head mounted display (HMD) or an AR helmet which is worn on the head of the user.

A 'real scene' is a scene of the real world which is seen by the user through the AR device, and may include a real world object. A 'virtual image' is an image formed by an optical engine and may include both a still image and a moving image. The virtual image is seen together with the real scene, and may be an image including information about the real world object in the real scene, information about an operation of the AR device, a control menu, or the like.

Therefore, a general AR device includes an optical engine for forming a virtual image by using light generated by a light source, and a waveguide for guiding the virtual image formed by the optical engine, to the eyes of the user, the waveguide being made of a transparent material to allow a scene of the real world to be seen therethrough. As described above, because the AR device needs to allow the scene of the real world to be seen therethrough, an optical element for changing a path of light, which basically has linearity, is required to guide the light from the optical engine to the eyes of the user through the waveguide. In this case, the path of light may be changed using reflection by a mirror or using diffraction by a diffractive element such as a diffractive optical element (DOE) or a holographic optical element (HOE), but is not limited thereto.

The disclosure will now be described more fully with reference to the accompanying drawings.

FIG. 1 is a view illustrating a gaze tracking device according to an example embodiment of the disclosure.

A gaze tracking device 1000 according to an example embodiment of the disclosure may be, but is not limited to, an AR device, and may include any device including a gaze tracking sensor and performing a gaze tracking function.

Referring to FIG. 1, the gaze tracking device 1000, which is a glasses-type display device, may include a glasses-type body wearable by a user. However, the disclosure is not limited thereto, and as such, according to another example embodiment, the gaze tracking device 1000 may be another type of wearable device such as a head mounted device (HMD).

The glasses-type body may include a frame (or a rim) 110 and a support 190. The support 190 may extend from the frame 110 and be used to seat the AR device on a user's head. The support 190 may include temples 190L and 190R and a nose support. The temples 190L and 190R may extend from the frame 110 and may be used to fix the AR device 1000 to the user's head on a side surface of the glasses-type body. The nose support may extend from the frame 110 and may be used to seat the gaze tracking device 1000 on a user's nose. Examples of the nose support may include, but are not limited to, a nose bridge and a nose pad.

A lens 1350 and a waveguide 1320 may be provided on the frame 110. The lens 1350 may include a left-eye lens 1350L and a right-eye lens 1350R. The waveguide 1320 may be configured to receive projected light via an input region and output at least a portion of the received light via an output region. The waveguide 1320 may include a left-eye waveguide 1320L and a right-eye waveguide 1320R.

The left-eye lens 1350L and the left-eye waveguide 1320L may be provided at a location corresponding to the left eye of the user, and the right-eye lens 1350R and the right-eye waveguide 1320R may be provided at a location corresponding to the right eye of the user. For example, the left-eye lens 1350L and the left-eye waveguide 1320L may be attached to each other, or the right-eye lens 1350R and the right-eye waveguide 1320R may be attached to each other, but embodiments of the disclosure are not limited thereto.

An optical engine 1310 of a projector that projects display light containing an image may include a left-eye optical engine 1310L and a right-eye optical engine 1310R. The left-eye optical engine 1310L and the right-eye optical engine 1310R may be located on both sides of the gaze tracking device 1000. Alternatively, one optical engine 1310 may be included in a central portion around the nose support of the gaze tracking device 1000. Light emitted from the optical engine 1310 may be displayed through the waveguide 1320.

A gaze detection module 1500 may be provided on a rim portion of the lens of the gaze tracking device 1000, and may include, for example, a light emitter that provides light toward the user's eyes and a light receiver that receives provided light. The light emitter may provide light toward the user's eye area while changing the direction of light at predetermined time intervals. For example, light (e.g., infrared (IR) light) provided from a light source module may be projected toward the user's eyes in a pattern. According to an example embodiment, the pattern may be a predetermined pattern (e.g., a straight line in a longitudinal direction or a straight line in a transverse direction). The gaze detection module 1500 may track the gaze of the user by identifying a corneal region and a pupil region of the user's eyes, based on a change in the amount of light reflected by the user's eye region.

Figure 2:
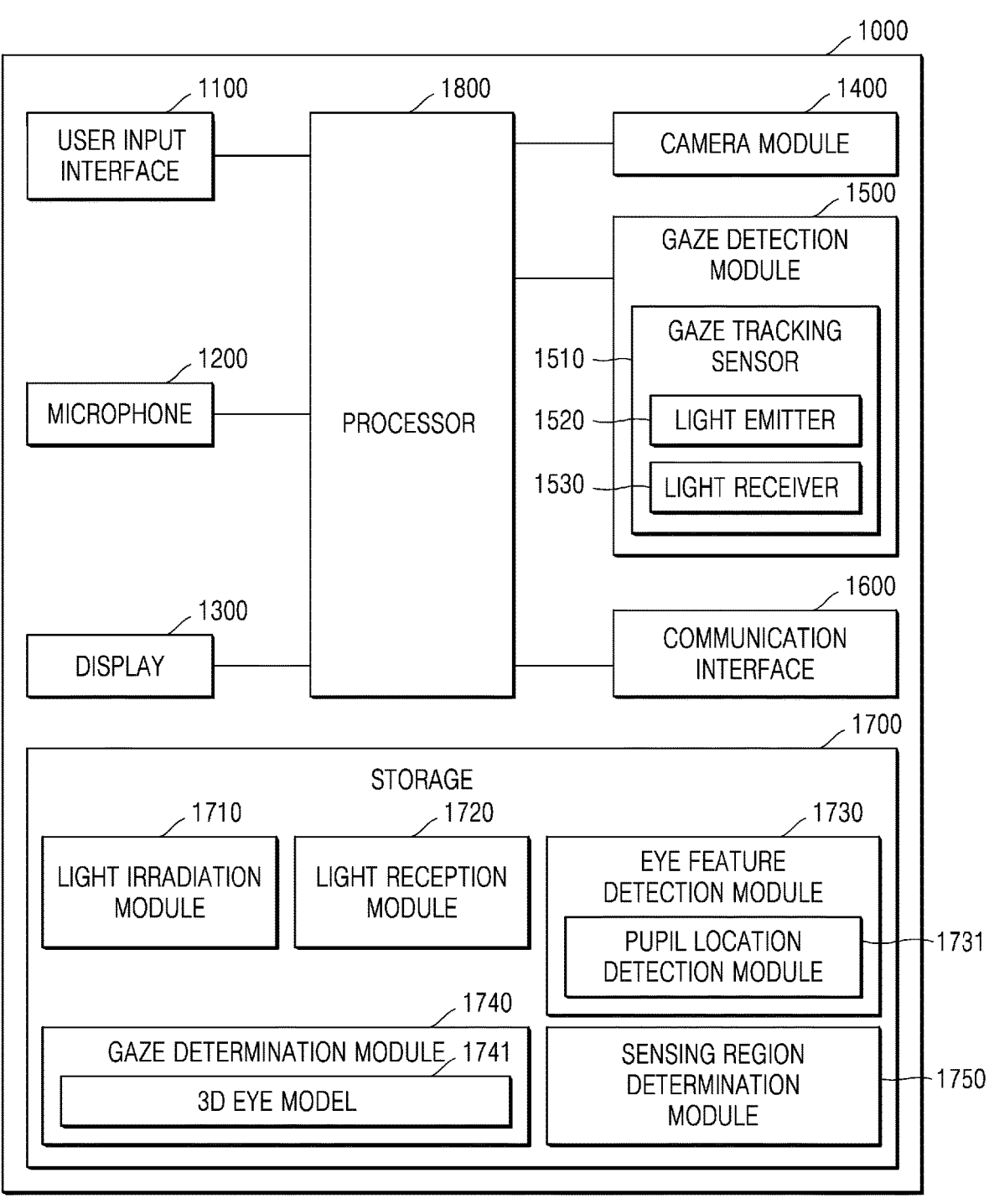
FIG. 2 is a detailed block diagram of a gaze tracking device according to an example embodiment of the disclosure.

FIG. 2 is a block diagram of the gaze tracking device 1000 according to an example embodiment of the disclosure.

The gaze tracking device 1000 according to an example embodiment of the disclosure may be, but is not limited to, an AR device, and may refer to any device including a gaze tracking sensor and performing a gaze tracking function.

Referring to FIG. 2, the gaze tracking device 1000 according to an example embodiment of the disclosure may include a user input interface 1100, a microphone 1200, a display 1300, a camera module 1400, a gaze detection module 1500, a communication interface 1600, a storage 1700, and a processor 1100. The gaze detection module 1500 may include a gaze tracking sensor 1510, and the gaze tracking sensor 1510 may include a light emitter 1520 and a light receiver 1530. According to an example embodiment, the modules, such as the camera module 1400 and the gaze detection module 1500, may include one or more hardware components. For example, the camera module 1400 may include one or more cameras or one or more sensors configured to capture an image. For example, the gaze detection module 1500 may include one or more sensors.

The user input interface 1100 refers to a unit via which a user inputs data for controlling the gaze tracking device

1000. For example, the user input interface 1100 may include, but is not limited to, at least one of a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

The microphone 1200 receives an external audio signal and converts the external audio signal into electrical audio data. For example, the microphone 1200 may receive an audio signal from an external device or a speaking person. Various noise removal algorithms may be used to remove noise that is generated while the external audio signal is being received via the microphone 1200. The microphone 1200 may receive a user's voice input for controlling the gaze tracking device 1000.

The display 1300 displays information that is processed by the gaze tracking device 1000. For example, the display 1300 may display a user interface for capturing an image of surroundings of the gaze tracking device 1000, and information related to a service provided based on the captured image of the surroundings of the gaze tracking device 1000.

According to an example embodiment of the disclosure, the display 1300 may provide an AR image. As shown in FIG. 1, the display 1300 may include the optical engine 1310 and the waveguide 1320. The waveguide 1320 may include a transparent material through which a partial region of a rear surface is visible when the user wears the gaze tracking device 1000. The waveguide 1320 may be configured as a flat plate of a single layer or multi-layer structure including a transparent material through which light may be internally reflected and propagated. The waveguide 1320 may face an exit surface of the optical engine 1310 to receive light of a virtual image projected from the optical engine 1310. Here, the transparent material is a material through which light is capable of passing, and may not have transparency of 100% and may have a certain color. According to an example embodiment of the disclosure, the waveguide 1320 includes the transparent material, and thus the user may view not only a virtual object of the virtual image but also an external real scene, so that the waveguide 1320 may be referred to as a see-through display. The display 1300 may output the virtual object of the virtual image through the waveguide 1320, thereby providing an AR image. When the gaze tracking device 1000 is a glasses type device, the display 1300 may include a left display and a right display.

The camera module 1400 may photograph the surroundings of the gaze tracking device 1000. According to an example embodiment, the camera module may include a camera, or an imaging sensor, but the disclosure is not limited thereto. The camera module 1400 may obtain an image frame, such as a still image or a moving picture, via an image sensor, when an application requiring a photographing function is executed. An image captured via the image sensor may be processed by the processor 1100 or a separate image processor. The camera module 1400 may include, for example, a rotatable RGB camera module or at least one of a plurality of depth camera modules, but embodiments of the disclosure are not limited thereto.

The gaze detection module 1500 may detect and track the gaze of the user wearing the gaze tracking device 1000. The gaze detection module 1500 may be installed in a direction toward the user's eyes, and may detect a gaze direction of the user's left eye and a gaze direction of the user's right eye. Detecting the user's gaze direction may include obtaining gaze information related to the user's gaze.

The gaze detection module 1500 may include a gaze tracking sensor 1510 capable of emitting IR light to detect a gaze of the user and receiving the IR light. The gaze tracking sensor 1510 may include the light emitter 1520 that emits IR light and the light receiver 1530 that receives the IR light, and may obtain sensor data including information related to the eyeball and gaze of the user wearing the gaze tracking device 1000. The information related to the user's eyeball and gaze may include, but is not limited to, at least one of information on the location of a glint feature point of the user's eyeball, information on the size and location of the pupil, information on the size and location of the iris, information on the size and location of the cornea, and information on the size and location of the eyeball. The sensor data refers to raw data from IR light being emitted by the light emitter 1520, reflected by the user's eyes, and received by the light receiver 1530, and the information related to the user's eyeball and gaze may be obtained by analyzing the sensor data.

The light emitter 1520 of the gaze detection module 1500 may emit the IR light so that the IR light may be directed toward the user's eyes. IR light reflected by the user's eyes may be received by the light receiver 1530 of the gaze detection module 1500. The light receiver 1520 may be provided at a position in the gaze tracking device 1000 where the IR light reflected by the user's eyes may be received.

The light emitter 1520 and the light receiver 1530 of the gaze tracking device 1000 may be provided on an inner side portion of the support 190 of the gaze tracking device 1000, which is a position between the support 190 and the user's eyes. In this case, the gaze tracking device 1000 may further include a light reflector, and the light emitter 1520 and the light receiver 1530 may be provided to face the light reflector from the support 190 of the gaze tracking device 1000. The light emitter 1520 and the light receiver 1530 may be positioned on the support 190 of FIG. 1 that supports the gaze tracking device 1000 on the user's face, like the temple and the nose support of FIG. 1.

The light reflector may reflect the light emitted by the light emitter 1520. The light reflector and the waveguide 1320 may be provided at positions corresponding to the user's eyes, and may be attached to each other. The IR light emitted by the light emitter 1520 may be reflected by the light reflector and may be directed toward the user's eyes, and IR light reflected again by the user's eyes may be reflected by the light reflector and may be directed toward the light receiver 1530. However, even in such a case, for convenience of explanation, a description of light reflection in which the light reflector intervenes will be omitted, and it will be described that the light emitter 1520 emits IR light to the user's eyes, and the light emitted by the light emitter 1520 is reflected by the user's eye and received by the light receiver 1530. For example, the light emitter 1520 may be an IR light-emitting diode (LED) that emits IR light, and the light receiver 1530 may be an IR camera that captures IR light. In this case, the IR camera may capture the user's eyes using the IR light reflected by the user's eyes. When the light emitter 1520 is the IR LED and the light receiver 1530 is the IR camera, the light emitter 1520 may emit IR light of planar light toward the user's eyes, and the light receiver 1530 may receive the IR light of the planar light reflected by the user's eyes.

The light emitter 1520 may emit the IR light of the planar light toward at least a portion of the entire region of the user's eyes, based on a set sensing region. The sensing region may be set as a region where the information related to the eyeball and gaze of the user, which is for detecting the gaze of the user, may be obtained from the IR light reflected by the user's eyes and received by the light receiver 1530.

Alternatively, for example, the light emitter 1520 may be an IR scanner that emits IR light, and the light receiver 1530 may be an IR detector that detects IR light. In this case, the IR scanner may emit IR light for scanning the user's eyes to be directed toward the user's eyes, and the IR detector may detect the IR light reflected by the user's eyes. When the light emitter 1520 is the IR scanner that emits IR light and the light receiver 1530 is the IR detector that detects IR light, the light emitter 1520 may emit line lights in the form of line. The light emitter 1520 may emit the IR light of the line light toward a portion of the entire region of the user's eyes, based on the set sensing region. The sensing region may be set as a region where the information related to the eyeball and gaze of the user, which is for detecting the gaze of the user, may be obtained from the IR light reflected by the user's eyes and received by the light receiver 1530.

Alternatively, when the light emitter 1520 is the IR scanner that emits IR light and the light receiver 1530 is the IR detector that detects IR light, the light emitter 1520 may emit point light in the form of dot. The light emitter 1520 may emit the IR light of the dot light toward a portion of the entire region of the user's eyes, based on the set sensing region. The sensing region may be set as a region where the information related to the eyeball and gaze of the user, which is for detecting the gaze of the user, may be obtained from the IR light reflected by the user's eyes and received by the light receiver 1530.

In this case, as the range (sensing region) of the user's eyes covered by the IR light emitted by the light emitter 1520 increases, that is, as the region where the light emitter 1520 emits light becomes wider, even when an external factor (e.g., noise caused by external light or pupil occlusion caused by blinking of the user's eyes) occurs, the possibility of success in tracking the user's gaze increases. On the other hand, as the range (sensing region) of the user's eyes covered by the IR light emitted by the light emitter 1520 decreases, that is, as the region where the light emitter 1520 emits light becomes narrower, the accuracy of tracking the user's gaze may increase, and a gaze tracking speed may increase. Therefore, there is a need to determine a sensing region that is robust to external factors while ensuring a gaze tracking speed and a gaze tracking accuracy.

A detailed method of determining a sensing region will be described in detail later with reference to FIGS. 12 through 15.

When the light emitter 1520 is the IR scanner and the light receiver 1530 is the IR detector, the light emitter 1520 may emit IR light of the point light or line light to the user's eyes, and the light receiver 1530 may receive the IR light of the point light or line light reflected by the user's eyes. In this case, the light emitter 1520 may sequentially emit IR light while moving a light emitting direction of the light emitter 1520 so that the IR light of the point light or line light may cover a space where the user's eyes are located. Although the IR scanner generally includes the IR LED and a micro-electro mechanical systems (MEMS) mirror capable of controlling a direction of the IR light emitted by the IR LED and reflecting the IR light, the IR scanner, the IR LED and the MEMS mirror are hereinafter collectively referred to as and described as an IR scanner. In addition, although the IR detector generally includes several photodiodes installed in a part where light detection is required, the IR detector and the photodiodes are hereinafter described as an IR detector or a detector.

The gaze detection module 1500 may provide sensor data to the processor 1100, and the processor 1100 may obtain gaze information of the user, based on the sensor data. The sensor data is data obtained by the gaze tracking sensor 1510 of the gaze detection module 1500, and may include a type (e.g., point light, line light, or planar light) of IR light emitted by the light emitter 1520, characteristics of the IR light emitted by the light emitter 1520, data regarding an emission region of the IR light emitted by the light emitter 1520, and data indicating the characteristics of the IR light received by the light receiver 1530.

Further, the gaze information of the user, which is information related to the user's gaze, may be generated by analyzing the sensor data and may include information about, for example, a location of the user's pupil, a location of a pupil central point, a location of the user's iris, centers of the user's eyes, locations of glint feature points of the user's eyes, a gaze point of the user, a gaze direction of the user, etc., but the disclosure is not limited thereto. The gaze direction of the user may be, for example, a direction of the user's gaze from the center of the user's eyes toward the gaze point at which the user gazes. For example, the gaze direction of the user may be represented by a vector value from the center of the user's left eye toward the gaze point and a vector value from the center of the user's right eye toward the gaze point, but the disclosure is not limited thereto.

According to an example embodiment of the disclosure, the gaze detection module 1500 may detect sensor data including information related to the eyeball and gaze of the user wearing the gaze tracking device 1000 at pre-determined time intervals.

The communication interface 1600 may transmit/receive data for receiving a service related to the gaze tracking device 1000 to/from an external device and a server.

The storage 1700 may store programs that are to be executed by the processor 2200 to be described later, and may store data input to or output from gaze tracking device 1000. According to an example embodiment, the storage 1700 may store one or more instructions or program codes for performing the gaze tracking method.

The storage 1700 may include at least one selected from an internal memory and an external memory. The internal memory may include, for example, at least one selected from volatile memory (for example, dynamic RAM (DRAM), static RAM (SRAM), or synchronous dynamic RAM (SDRAM)), non-volatile memory (for example, one time programmable ROM (OTPROM), programmable ROM (PROM), erasable and programmable ROM (EPROM), electrically erasable and programmable ROM (EEPROM), mask ROM, or flash ROM), a hard disk drive (HDD), and a solid state drive (SSD). According to an example embodiment of the disclosure, the processor 1100 may load a command or data received from at least one of the non-volatile memory or another element into the volatile memory and process the command or the data. The processor 1100 may store data received or generated from another element in the non-volatile memory. The external memory may include, for example, at least one selected from Compact Flash (CF), Secure Digital (SD), Micro-SD, Mini-SD, extreme Digital (xD) and Memory Stick.

The programs stored in the storage 1700 may be classified into a plurality of modules according to their functions. The plurality of modules may include, for example, a light irradiation module 1710, a light reception module 1720, an eye feature detection module 1730, a pupil location detection module 1731, a gaze determination module 1740, a three-dimensional (3D) eye model 1741, and a sensing region determination module 1750. For example, a memory may be included in the gaze detection module 1500, and, in this case, the light irradiation module 1710 and the light reception module 1720 may be stored as firmware in the memory included in the gaze detection module 1500.

The processor 1100 controls the overall operation of the gaze tracking device 1000. For example, the processor 1100 may execute the programs stored in the storage 1700, thereby generally controlling the user input interface 1100, the microphone 1200, the display 1300, the camera module 1400, the gaze detection module 1500, the communication interface 1600, the storage 1700, etc. According to an example embodiment, the processor 1100 may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions.

The processor 1100 may execute the light irradiation module 1710, the light reception module 1720, the eye feature detection module 1730, the pupil location detection module 1731, the gaze determination module 1740, the 3D eye model 1741, and the sensing region determination module 1750, thereby determining the gaze point of the user and the gaze direction of the user.

According to an example embodiment of the disclosure, the gaze tracking device 1000 may include a plurality of processors 1800, and the light irradiation module 1710, the light reception module 1720, the eye feature detection module 1730, the pupil location detection module 1731, the gaze determination module 1740, the 3D eye model 1741, and the sensing region determination module 1750 may be executed by the plurality of processors 1800.

For example, some of the light irradiation module 1710, the light reception module 1720, the eye feature detection module 1730, the pupil location detection module 1731, the gaze determination module 1740, the 3D eye model 1741, and the sensing region determination module 1750 may be executed by a first processor, and the others of the light irradiation module 1710, the light reception module 1720, the eye feature detection module 1730, the pupil location detection module 1731, the gaze determination module 1740, the 3D eye model 1741, and the sensing region determination module 1750 may be executed by a second processor, but the disclosure is not limited thereto.

For example, the gaze detection module 1500 may include another processor and a memory, and the other processor may execute the light irradiation module 1710 and the light reception module 1720 that are stored in the memory, and the processor 1100 may execute the eye feature detection module 1730, the pupil location detection module 1731, the gaze determination module 1740, the 3D eye model 1741, and the sensing region determination module 1750 that are stored in the storage 1700.

The processor 1100 may execute the light irradiation module 1710 stored in the storage 1700 so that the light emitter 1520 may emit IR light toward the user's eyes. The processor 1100 may control the light emitter 1520 by executing the light irradiation module 1710, and the light emitter 1520 controlled by the processor 1100 may emit the IR light toward at least a portion of the entire region of the user's eyes, based on the set sensing region. The sensing region may be set as a region where the information related to the eyeball and gaze of the user, which is for detecting the gaze of the user, may be obtained from the IR light reflected by the user's eyes and received by the light receiver 1530.

As described above, as the range (sensing region) of the user's eyes covered by the IR light emitted by the light emitter 1520 increases, that is, as the region where the light emitter 1520 emits light becomes wider, even when an external factor (e.g., noise caused by external light or pupil occlusion caused by blinking of the user's eyes) occurs, the possibility of success in tracking the user's gaze increases. On the other hand, as the range (sensing region) of the user's eyes covered by the IR light emitted by the light emitter 1520 decreases, that is, as the region where the light emitter 1520 emits light becomes narrower, the accuracy of tracking the user's gaze may increase, and a gaze tracking speed may increase. Therefore, there is a need to determine a sensing region that is robust to external factors while ensuring a gaze tracking speed and a gaze tracking accuracy.

A detailed method of determining a sensing region, according to an example embodiment of the disclosure, will be described in detail later with reference to FIGS. 12 through 15.

For example, when the light receiver 1530 is an IR camera, the light emitter 1520 may be an IR LED, and the processor 1100 may control the IR LED so that the IR light emitted from the IR LED may be radiated to a region including the user's eyes, in order for the IR camera to photograph the user's eyes. For example, in order to radiate the light emitted by the IR LED to the region including the user's eyes, the processor 1100 may control a radiation direction of the IR light emitted by the IR LED, and apply power to the IR LED, thereby controlling emission of the IR light from the IR LED.

According to an example embodiment of the disclosure, for example, the IR camera and the IR LED may be installed toward the user's eyes so that the IR camera may photograph the entire region of the user's eyes, and the processor 1100 may control the IR LED installed toward the user's eyes to emit the IR light.

Alternatively, when the light receiver 1530 is an IR detector, the light emitter 1520 may be an IR scanner, and the processor 1100 may control the IR scanner so that the IR light emitted by the IR scanner scans the user's eyes, in order for the IR detector to detect the user's eyes. For example, in order for the light emitted by the IR scanner to scan the user's eyes, the processor 1100 may control a radiation direction and a radiation range of the IR light emitted by the IR scanner, and apply power to the IR scanner, thereby controlling emission of the IR light from the IR scanner.

The processor 1100 may execute the light reception module code 1720 stored in the storage 1700 so that the light receiver 1530 may receive the light reflected by the user's eyes. The processor 1100 may control the light receiver 1530 by executing the light reception module 1720, and the light receiver 1530 controlled by the processor 1100 may receive the light reflected by the user's eyes.

For example, when the light emitter 1520 is an IR LED, the light receiver 1530 may be an IR camera, and the processor 1100 may control the IR camera to capture the user's eyes through the light reflected by the user's eyes.

Alternatively, for example, when the light emitter 1520 is an IR scanner, the light receiver 1530 may be an IR detector, and the processor 1100 may control the IR detector to detect the IR light reflected by the user's eyes, so that the IR detector may detect the user's eyes.

The processor 1100 may execute the eye feature detection module 1730 stored in the storage 1700, thereby detecting features related to the eyeball and gaze of the user.

The eye feature detection module 1730 may include the pupil location detection module 1731. The processor 1100 may execute the pupil location detection module 1731 stored in the storage 1700, thereby detecting pupil locations of the user's eyes. The pupil location detection module 1731 may identify the pupil locations of the user's eyes based on the IR light reflected by the user's eyes. According to an example embodiment, the pupil location detection module 1731 may identify a pupil location of one eye of the user based on the IR light reflected by the eye of the user. According to another example embodiment, the pupil location detection module 1731 may identify pupil locations of both eyes of the user based on the IR light reflected by the eyes of the user.

For example, when the light receiver 1530 is an IR camera, the pupil location detection module 1731 may identify the pupil locations of the user's eyes from an image captured by the IR camera. Alternatively, for example, when the light receiver 1530 is an IR detector, the pupil location detection module 1731 may analyze the IR light sequentially obtained by the IR detector, thereby calculating the pupil locations of the user's eyes.

The pupil location detection module 1731 may identify the pupil central points of the user's eyes, thereby identifying the pupil locations of the user's eyes.

For example, the processor 1100 may execute the eye feature detection module 1730, thereby detecting locations of pupil feature points of the user's eyes and locations of glint feature points of the user's eyes. The pupil feature point may be, for example, a pupil central point, and the glint feature point of the eyes may be a portion having brightness greater than or equal to a certain value in a detected eye region. The location of the pupil feature point and the location of the glint feature point of the eyes may be identified by, for example, a coordinate value indicating a location in a coordinate system of the light receiver 1530. For example, the coordinate system of the light receiver 1530 may be a coordinate system of the IR camera or a coordinate system of the IR detector, and the coordinate value in the coordinate system of the light receiver 1530 may be a two-dimensional (2D) coordinate value.

The processor 1100 may detect features related to the eyeball and gaze of the user by analyzing the light received by the light receiver 1530. For example, when the light receiver 1530 is an IR camera, the processor 1100 may identify the locations of the pupil feature points and the locations of the glint feature points of the eyes from the image captured by the IR camera. Alternatively, for example, when the light receiver 1530 is an IR detector, the processor 1100 may analyze the IR light detected by the IR detector, thereby identifying the location of the pupil feature point and the location of the glint feature point of the eyes.

Also, the processor 1100 may analyze the light received by the light receiver 1530, thereby obtaining a coordinate value indicating the location of the pupil feature point and a coordinate value indicating the location of the glint feature point of the eyes. For example, when the light receiver 1530 is an IR camera, the processor 1100 may obtain the coordinate value of the pupil feature point and the coordinate value of the glint feature point of the eyes from the coordinate system of the IR camera. The coordinate system of the IR camera may be used to indicate the location of the pupil feature point and the location of the glint feature point of the eyes, and, for example, coordinate values corresponding to pixels of an image captured by the IR camera on the coordinate system of the IR camera may be previously set. Also, based on a property (e.g., brightness) of IR light received through the IR camera, a coordinate value corresponding to a feature point of the eyes may be identified.

For example, when the light receiver 1530 is an IR camera, the processor 1100 may identify the location of the pupil central point from the image captured by the IR camera. The processor 1100 may identify the brightness of IR light received through an image sensor of the IR camera including a plurality of photodiodes, and may identify at least one pixel that receives IR light indicating the pupil among the pixels of the image captured by the IR camera, thereby identifying the location of the pupil central point. For example, locations of the pixels in the image captured by an IR camera may be identified through the coordinate system of the IR camera, and the location of the pupil central point may have a coordinate value in the coordinate system of the IR camera, as a location value of at least one pixel corresponding to the pupil central point.

For example, the processor 1100 may identify a location of the brightest point in the image captured by the IR camera, in order to identify the glint feature point of the eyes. The processor 1100 may identify the brightness of the IR light received through the image sensor of the IR camera including the plurality of photodiodes, and may identify at least one pixel corresponding to bright IR light equal to or greater than a certain reference among the pixels of the image captured by the IR camera, thereby identifying the location of the glint feature point of the eyes. For example, the processor 1100 may identify the pixel corresponding to the brightest IR light among the pixels of the image captured by the IR camera, thereby identifying the location of the glint feature point of the eyes. For example, the locations of the pixels in the image captured by the IR camera may be identified through the coordinate system of the IR camera, and the location of the glint feature point of the eyes may have a coordinate value in the coordinate system of the IR camera, as a location value of the pixel corresponding to the glint feature point of the eyes.

Alternatively, for example, when the light receiver 1530 is an IR detector, the processor 1100 may calculate the coordinate value of the pupil feature point and the coordinate value of the glint feature point of the eyes in the coordinate system of the IR detector.

When the light emitter 1520 is an IR scanner, the processor 1100 may control the IR scanner to sequentially radiate a point light source or a line light source to cover a region where the user's eyes are located, in order to scan the region where the user's eyes are located, and sequentially receive the light reflected by the user's eyes through the IR detector. In addition, the processor 1100 may analyze an array of light beams sequentially received through the IR detector, thereby identifying the pupil feature point and the glint feature point of the eyes.

The coordinate system of the IR detector may be used to indicate the location of the pupil feature point of the pupil and the location of the glint feature point of the eyes. According to an example embodiment, coordinate values corresponding to the light beams in the array of light beams sequentially received through the IR detector on the coordinate system of the IR detector may be previously set. For example, radiation directions, radiation ranges, and radiation times of light beams emitted by the IR scanner may be determined according to an operation setting value of the IR scanner, and a light array may be formed from the light beams emitted from the IR scanner. For example, based on the radiation direction and radiation time of the lights emitted by the IR scanner, and reception time of the light beams received by the IR detector, coordinate values corresponding to the light beams in the light array on the coordinate system of the IR detector may be identified. In addition, based on the property (e.g., brightness) of the light beams in the array of light beams sequentially received through the IR detector, light corresponding to the feature point of the eye and coordinate values of the light may be identified.

For example, the processor 1100 may identify light beams having a brightness equal to or less than a certain value from the received light array, thereby identifying the location of the pupil feature point based on coordinate values corresponding to the identified light beams on the coordinate system of the IR detector.

For example, the processor 1100 may identify light having a brightness equal to or greater than a certain value in the received light array, thereby identifying a coordinate value corresponding to the identified light on the coordinate system of the IR detector as the coordinate value of the glint feature point of the eye.

Also, for example, when the light receiver 1530 is an IR detector, the coordinate value of the pupil feature point and the coordinate value of the glint feature point of the eyes may be values calibrated by reflecting the degree of misalignment of the support 190 of the gaze tracking device 1000, which will be described below. In this case, the processor 1100 may calculate the coordinate value of the pupil feature point and the coordinate value of the glint feature point of the eyes calibrated by reflecting the degree of misalignment of the temple of the gaze tracking device 1000 and/or the degree of misalignment of the nose support. The calibrated coordinate values may be input to a mapping function.

The processor 1100 may execute the gaze determination module 1740 stored in the storage 1700, thereby obtaining information on the gaze of the user.

The gaze determination module 1740 may include the 3D eye model 1741.

The processor 1100 may execute the gaze determination module 1740, thereby calculating a location of the center of the user's eyes. The center of the user's eyes may be the center of user's eyeballs. The processor 1100 may calculate the location of the center of the user's eyes, based on the pupil location of the user's eyes obtained by the pupil location detection module 1731. For example, the center of the eye may be the center of the eyeball, and the location of the center of the user's eyes may have a 3D coordinate value in a coordinate system of a real space.

The processor 1100 may execute the gaze determination module 1740, thereby calculating a location of the gaze point of the user. In order to calculate the location of the gaze point of the user, the processor 1100 may previously generate a mapping function for calculating the location of the gaze point from features of the user's eyes. A mapping function f is a function for calculating the location of the gaze point of the user in consideration of the features of the user's eyes, and may be expressed as Target of gaze point=f (features of the user's eyes). For example, the location of the gaze point may have a 3D coordinate value in the coordinate system of the real space, but the disclosure is not limited thereto. For example, the location of the gaze point may have a 3D coordinate value in the coordinate system of the waveguide 1320, but the disclosure is not limited thereto.

The processor 1100 may execute the gaze determination module 1740, thereby applying the features related to the user's eyeball and gaze to the mapping function, thereby calculating the location of the gaze point of the user. Also, a gaze direction of the user may be determined based on the location of the central point of the user's eyes and the gaze point of the user calculated by the gaze determination module 1740.

Alternatively, the processor 1100 may calculate the gaze point of the user without using the above-described mapping function. For example, when the light receiver 1530 is an IR camera, the gaze determination module 1740 may calculate the gaze direction of the user from the image obtained by capturing the user's eyes by using a certain algorithm. In this case, the obtained gaze direction may be a vector value indicating the gaze direction of the user's eyes in the camera coordinate system.

The algorithm used to obtain the gaze direction of the user may be an algorithm for fitting the 3D eye model 1741. The algorithm for fitting the 3D eye model 1741 may be an algorithm for obtaining a vector value indicating the gaze direction of the user by comparing an eye image corresponding to a reference vector value indicating the gaze direction of the user with an image captured by an IR camera.

The 3D eye model 1741 is generated based on the features related to the user's eyeball and gaze obtained by the eye feature detection module 1730 and the location of the user's eye pupil obtained by the pupil location detection module 1731.

For example, the processor 1100 may execute the gaze determination module 1740 to 3D-model the eyeball of the user based on the locations of pupil feature points of the user's eyes, the locations of glint feature points of the user's eyes, and the location of the pupil detected by the eye feature detection module 1730.

The processor 1100 may update the 3D eye model 1741 based on the information related to the eyeball and gaze of the user wearing the gaze tracking device 1000, the information being detected by the gaze detection module 1500 at pre-determined time intervals.

A method, performed by the gaze determination module 1740, of updating the 3D eye model 1741 based on the information related to the user's eyeball and gaze and a method of obtaining the user's gaze direction by using the 3D eye model 1741 will be described in more detail with reference to FIGS. 12 through 15.

The processor 1100 may execute the sensing region determination module 1750 stored in the storage 1700, thereby determining a sensing region that is to be sensed in order for the gaze detection module 1500 to detect the gaze of the user.

In a case where a sensing center point and sensing coverage are fixed, gaze tracking performance may be deteriorated when the user's eyeball is rotated or the location of user's eyes relative to the sensing center point is changed due to a movement of the gaze tracking device 1000.

In a gaze detection process performed by the gaze detection module 1500, information on the location and feature points of the user's eyes is obtained through sensing, the gaze of the user is detected, and then the user's gaze is tracked through continuous sensing.

The processor 1100 drives the gaze determination module 1740 to perform gaze detection based on the data related to the eyeball and gaze of the user wearing the gaze tracking device 1000, the data being detected by the gaze detection module 1500 at certain time intervals, and update the 3D eye model 1741. According to an example embodiment, the data may detected by the gaze detection module 1500 at predetermined regular time intervals. Because changes in the user's eyeball and gaze feature points have been reflected in the updated 3D eye model 1741, the processor 1100 may drive the sensing region determination module 1750 to determine the sensing region in which the gaze tracking sensor 1510 of the gaze detection module 1500 is to operate.

A gaze tracking sensor according to an example embodiment of the disclosure may be the gaze detection module 1500 or the gaze tracking sensor 1510 illustrated in FIG. 2.

Figure 3A:
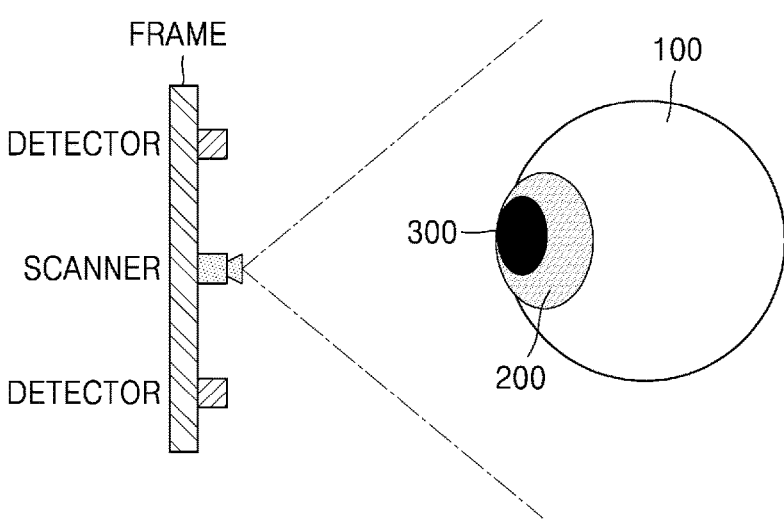
FIGS. 3A, 3B and 3C are views for explaining a method, performed by a gaze tracking sensor based on a scanner, of sensing a user's eye.
Figure 3B:
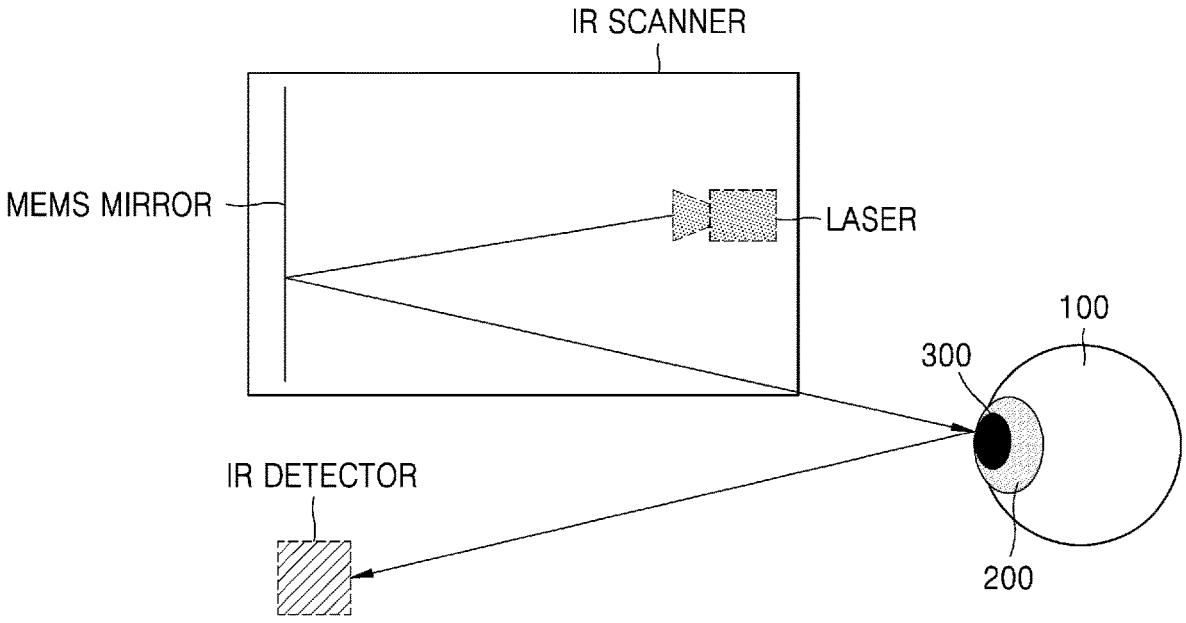
Figure 3C:
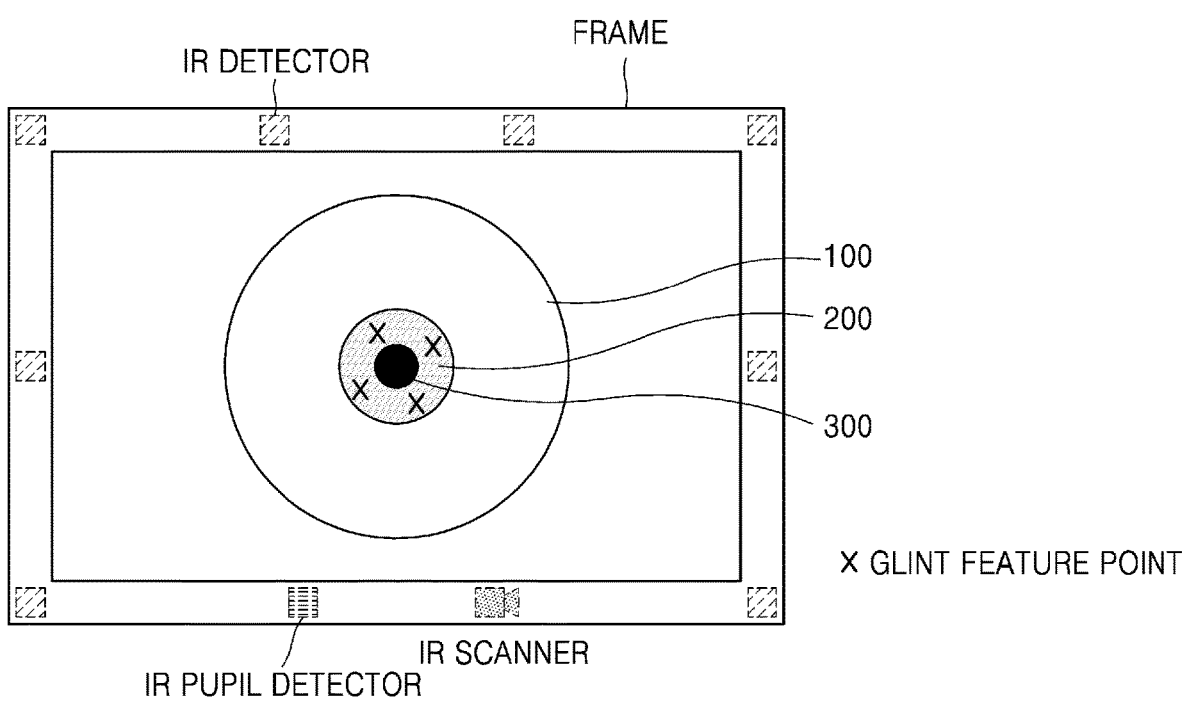

FIGS. 3A, 3B and 3C are views for explaining a method, performed by a gaze tracking sensor based on a scanner, of sensing a user's eye.

FIGS. 3A and 3B are side views of the gaze tracking sensor and the user's eye. Referring to FIGS. 3A and 3B, the gaze tracking sensor is provided to face the user's eye, and the scanner-based gaze tracking sensor may include a scanner and at least one detector.

Referring to FIG. 3A, the user's eye may be shaped as two overlapping spheres, and has a structure in which a cornea 200 having a smaller curvature protrudes from an eye ball 100 having a larger curvature. The cornea is covered with an iris and a front portion of the cornea has a pupil 300, which is a circular hole that absorbs light.

Gaze tracking may refer to obtaining a gaze vector that is a straight line that crosses the center point of the eyeball 100 and the center point of the pupil 300.

Referring to FIG. 3B, the scanner may include a laser and a mirror, and the mirror is configured in an angle-adjustable form.

When the light emitter 1520 is the IR scanner and the light receiver 1530 is the IR detector, the light emitter 1520 may emit IR light of the point light or line light to the user's eyes, and the light receiver 1530 may receive the IR light of the point light or line light reflected by the user's eyes. In this case, the light emitter 1520 may sequentially emit IR light beams while moving a light emitting direction of the light emitter 1520 so that the IR light of the point light or line light may cover a space where the user's eyes are located. Although the IR scanner generally includes the IR LED and a micro-electro mechanical systems (MEMS) mirror capable of controlling a direction of the IR light emitted by the IR LED and reflecting the IR light, the IR scanner, the IR LED and the MEMS mirror are hereinafter collectively referred to as and described as an IR scanner. In addition, although the IR detector generally includes several photodiodes installed in a part where light detection is required, the IR detector and the photodiodes are hereinafter described as an IR detector or a detector.

FIG. 3C is a front view of the gaze tracking sensor and the user's eye. Referring to FIG. 3C, the IR scanner-based gaze tracking sensor may be mounted on the frame of an AR device form factor in the user's eye direction and may include at least one IR scanner and a plurality of IR detectors, and at least one of the plurality of IR detectors may be used for pupil detection.

The IR LED may radiate a laser (IR light) toward the MEMS mirror, and IR light reflected by the MEMS mirror is reflected by the user's eye and is received by the IR detectors. At this time, because the angle of the MEMS mirror is adjustable, the laser radiated by the IR LED may be incident on the user's eye at various angles, and the detectors may receive the IR light reflected by the user's eye at various angles. The IR LED may emit IR light toward a portion of the entire region of the user's eyes, based on the set sensing region. The MEMS mirror may emit IR light toward a portion of the entire region of the user's eyes, based on the set sensing region. The sensing region may be set as a region where the information related to the eyeball and gaze of the user, which is for detecting the gaze of the user, may be obtained from the IR light reflected by the user's eyes and received by the detector.

Sensor data of the IR scanner-based gaze tracking sensor refers to raw data from IR light being emitted by the IR scanner, reflected by the user's eyes, and received by the IR detector, and the information related to the user's eyeball and gaze may be obtained by analyzing the sensor data.

The information related to the user's eyeball and gaze may include at least one of information on the location of a glint feature point of the user's eyeball, information on the size and location of the pupil, information on the size and location of the iris, information on the size and location of the cornea, and information on the size and location of the eyeball.

The glint feature point of the user's eyeball may be positioned at a point on the cornea where light is reflected brightly, and the number of glint feature points of the user's eyeball may vary according to a situation (e.g., the features of the user's eyes, the location of a light source, and existence or absence of an external light source). Because the pupil is a region that absorbs light incident on the user's eyeball, there is little or no reflected light.

Figure 4A:
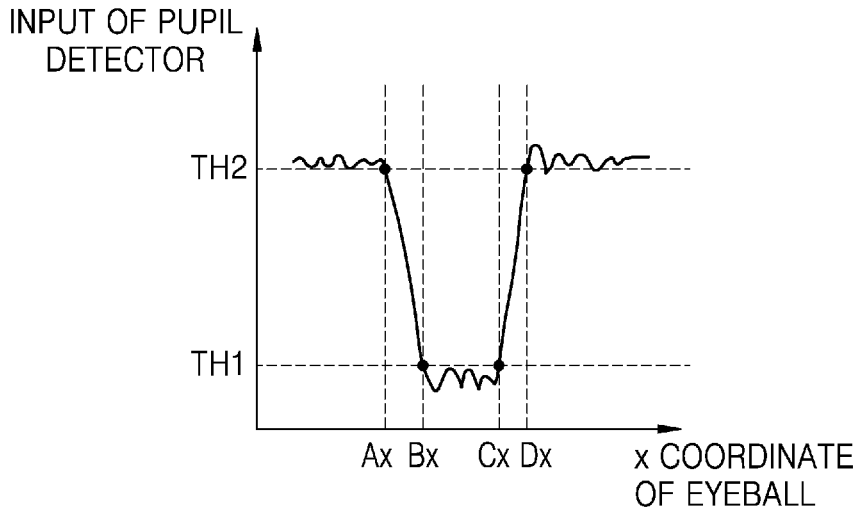
FIGS. 4A and 4B are graphs for explaining a method of obtaining pupil information by using the sensing data of the scanner-based gaze tracking sensor.
Figure 4A:
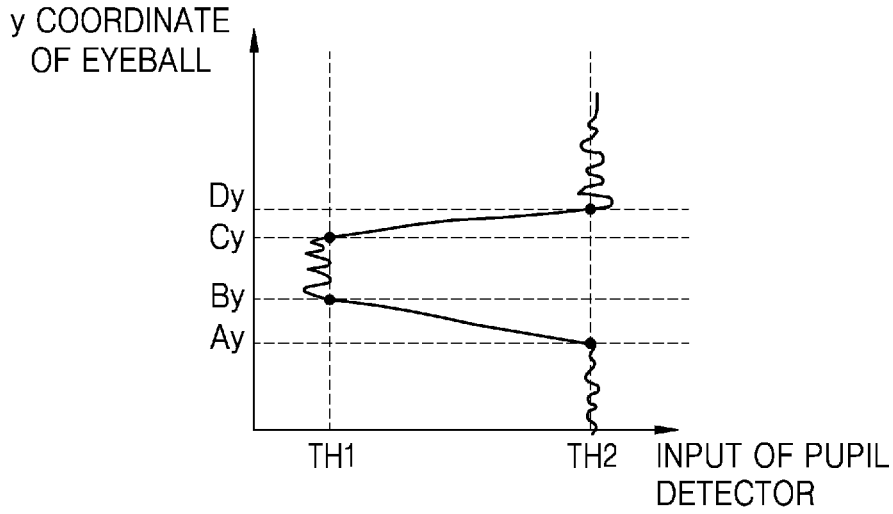
Figure 4B:
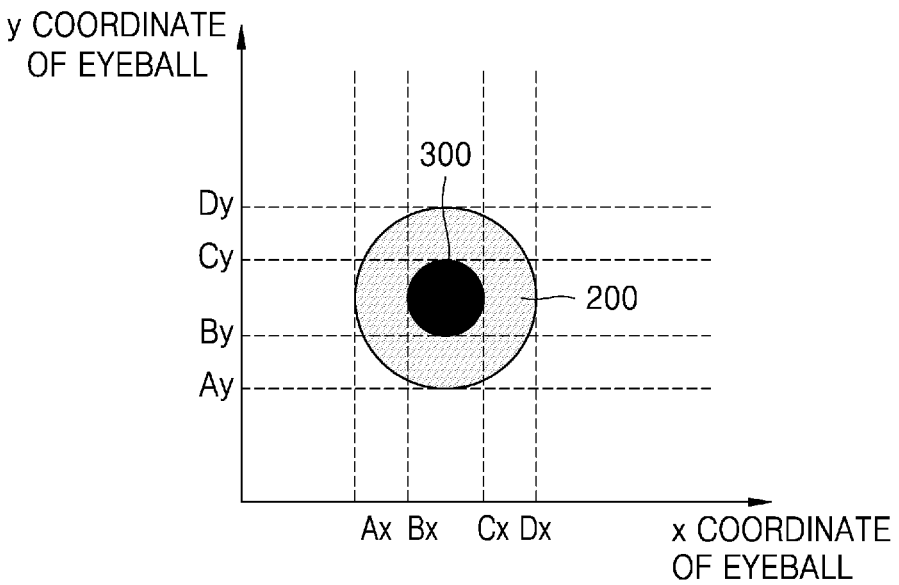

FIGS. 4A and 4B are graphs for explaining a method of obtaining pupil information by using the sensing data of the scanner-based gaze tracking sensor.

FIG. 4A shows a pupil detector input for each of the x-axis and y-axis directions of the scanner-based gaze tracking sensor. Referring to FIG. 4A, the pupil detector input has a U-shaped curve shape with a large value at the edge of the eyeball and a smaller value at the center of the eyeball. The pupil exists in the central portion of the eyeball, and because the pupil is a region that absorbs light incident on the user's eyeball, there is little reflected light, and the pupil detector input is low. However, because the edge of the eyeball has whites, most of the light incident on the eyeball is reflected, and thus the pupil detector input is high.

Accordingly, a location at which the pupil detector input is maintained high and then becomes lower than a second threshold brightness TH2 may be determined as start points (Ax and Ay) of the pupil or end points (Dx and Dy) of the pupil. Also, [Bx,Cx] and [By,Cy], which are low-level sections in which the pupil detector input is lower than a first threshold brightness TH1, may be determined as the location and range of the pupil.

If the user is not looking at the front but looking to the left or right, the input of the pupil detector may appear as a distorted U-shaped curve in which the location of a low level in the x-axis direction is biased to one side. On the other hand, if the user is looking to the top side or bottom side, the input of the pupil detector may appear as a distorted U-shaped curve in which the location of a low level in the y-axis direction is biased to one side. FIG. 4B shows the size and location of the pupil and the size and location of the cornea in the embodiment shown in FIG. 4A. Referring to FIG. 4B, the gaze tracking device 1000 may identify the size and location of the pupil and the size and location of the cornea based on the pupil detector input of the scanner-based gaze tracking sensor.

Accordingly, when the input of the pupil detector appears as shown in FIG. 4A, it may be estimated that the pupil is located in a section of Bx to Cx in the x-axis direction and a section of By to Cy in the y-axis direction. In this case, when the input of the pupil detector is analyzed, sections Ax-Bx, Cx-Dx, Ay-By, and Cy-Dy in which the input of the pupil detector rapidly changes correspond to a corneal region, and thus the gaze tracking device may obtain the size of the cornea by using the slope of the pupil detector input.

Because the region of the pupil and the cornea has the shape of a circle or an ellipse, a pupil 300 may be estimated a circle or oval within a [Bx,Cx,By,Cy] rectangle, and a cornea 200 may be estimated as a circle or ellipse within a [Ax,Dx,Ay, Dy] rectangle.

Figure 5A:
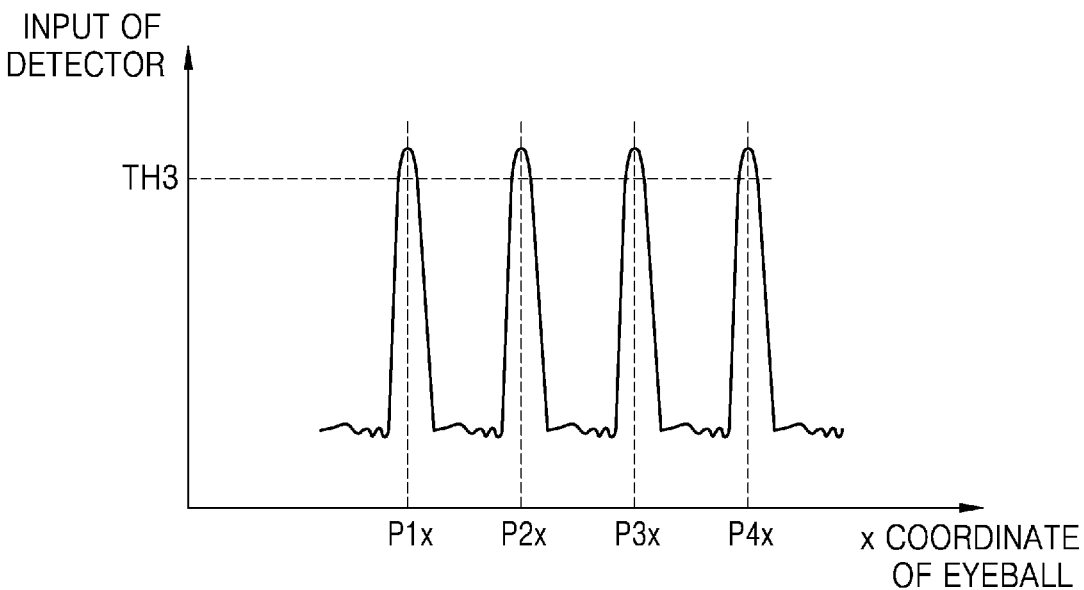
FIGS. 5A and 5B are graphs for explaining a method, performed by a scanner-based gaze tracking sensor, of sensing the eyeball of a user to obtain eye feature point information.
Figure 5A:
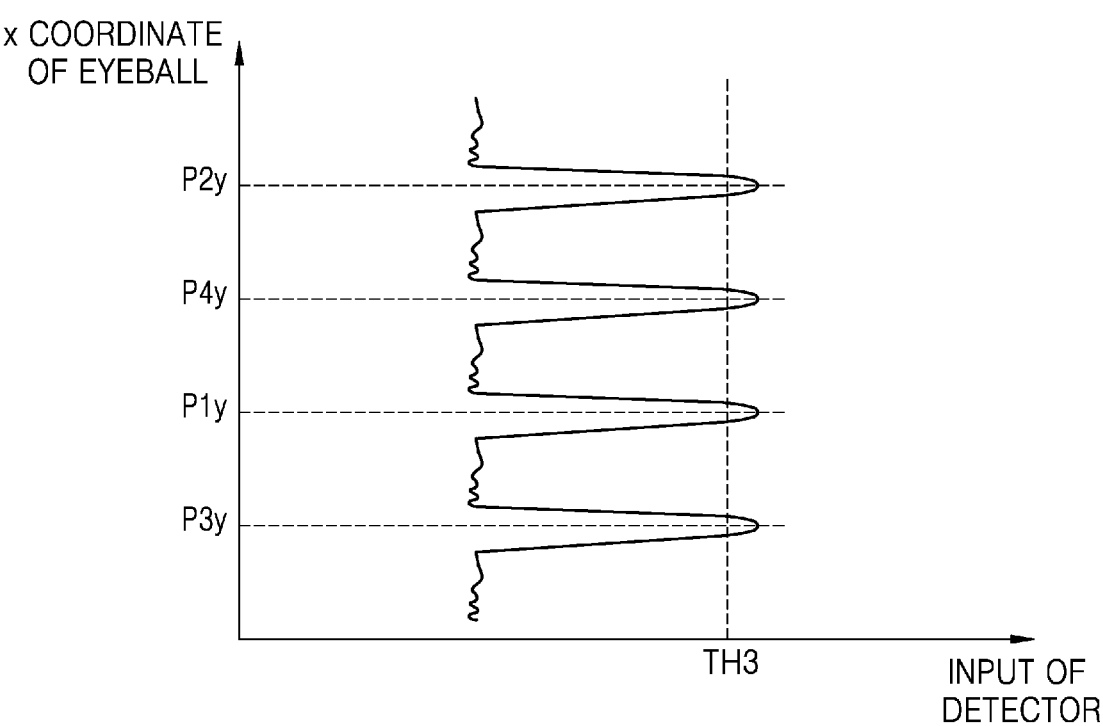
Figure 5B:
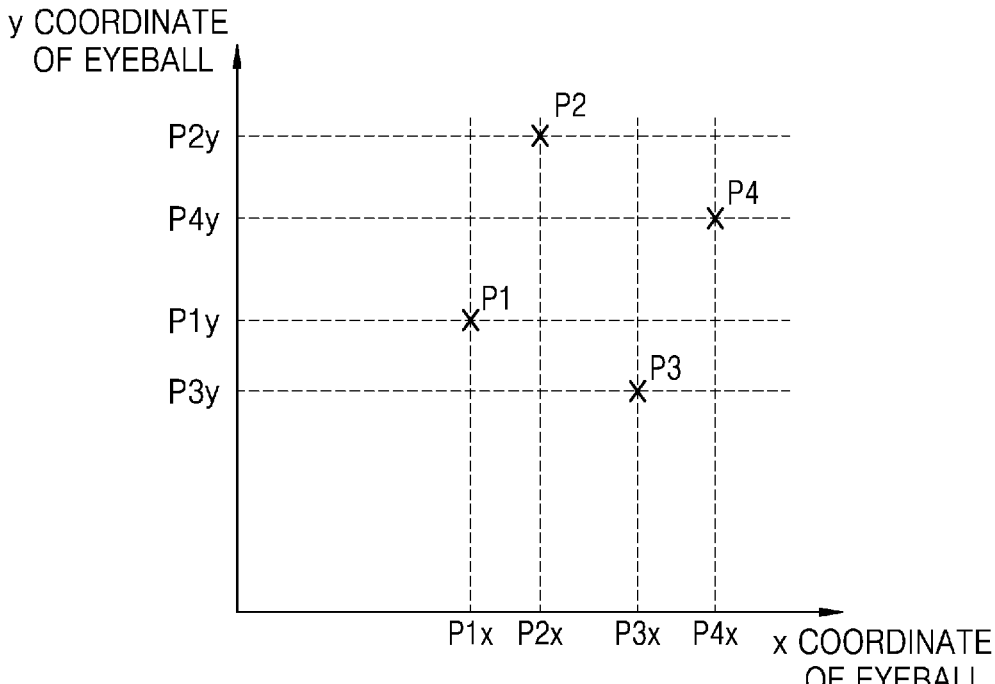

FIGS. 5A and 5B are graphs for explaining a method, performed by a scanner-based gaze tracking sensor, of sensing the eyeball of a user to obtain eye feature point information.

FIG. 5A shows a detector input for each of the x-axis and y-axis directions of the scanner-based gaze tracking sensor.

A glint feature point is a brightest point on the eyeball, and, because light is reflected the most at the glint feature point on the user's eyeball, a location detector input of the glint feature point on the region of the eyeball appears high. Accordingly, the gaze tracking device 1000 may determine a location in which the detector input indicates a peak value, as a glint location, during a section in which the detector input appears higher than a third threshold brightness TH3. The location of the glint feature point and number of glint feature points may vary according to a user's eye feature or a third threshold brightness setting.

Referring to FIG. 5A, the detector input represents peak values at P1$x$, P2$x$, P3$x$, and P4$x$ on an x-axis and peaks at P3$y$, P1$y$, P4$y$, and P2$y$ on a y-axis during a section having a brightness higher than the third threshold brightness.

FIG. 5B shows the locations of glint feature points in the embodiment shown in FIG. 5A. When the location where the detector input is high is indicated on the x-y orthogonal coordinates of the eyeball, there are four glint feature points P1, P2, P3, and P4, and their locations are [P1$x$, P1$y$], [P2$x$, P2$y$], [P3$x$, P3$y$], and [P4$x$, P4$y$], respectively, as shown in FIG. 5B. As described above, the gaze tracking device 1000 may analyze pieces of data of the scanner-based gaze tracking sensor to obtain information related to the user's eyeball and gaze, the information including information on the size and location of the pupil, the size and location of the cornea, the size and location of the eyeball, and the number and locations of glint feature points.

As described above, as the sensing region becomes wider, even when external factors (e.g., noise caused by external light and pupil occlusion caused by rotation of the user's eyeball or the user's eye blink) occur, the possibility of success in tracking the user's gaze is increased. On the other hand, as the sensing region becomes narrower, the user's gaze tracking accuracy may increase and the gaze tracking speed may increase. Therefore, there is a need to determine an optimal sensing region that is robust to external factors while ensuring a gaze tracking speed and a gaze tracking accuracy.

Figure 6A:
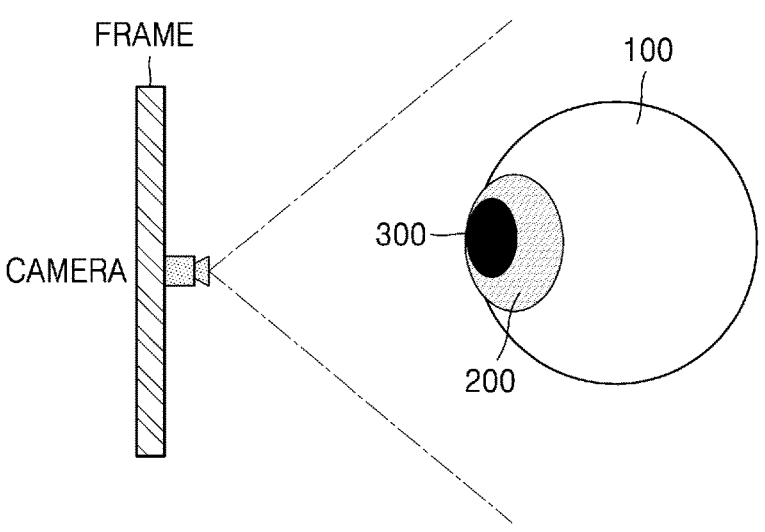
FIGS. 6A and 6B are views for explaining a method, performed by a gaze tracking sensor based on a camera, of sensing a user's eyeball.
Figure 6B:
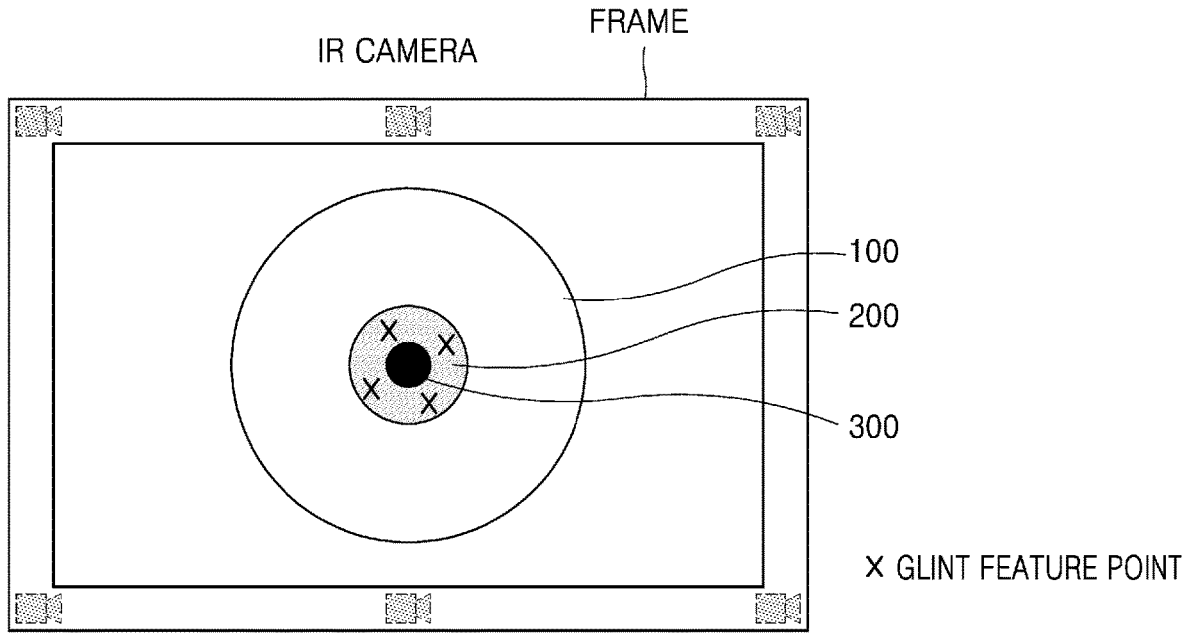

FIGS. 6A and 6B are views for explaining a method of sensing a user's eyeball, performed by a gaze tracking sensor based on a camera.

FIG. 6A is a side view of the gaze tracking sensor and the user's eye. Referring to FIG. 6A, the gaze tracking sensor is provided to face the user's eye, and the camera-based gaze tracking sensor may include at least one camera. FIG. 6B is a front view of the gaze tracking sensor and the user's eye. Referring to FIG. 6B, the IR camera-based gaze tracking sensor may be mounted on the frame of an AR device form factor in the user's eye direction and may include at least one IR camera.

When the light emitter 1520 is an IR LED that emits IR light, and the light receiver 1530 is an IR camera that captures IR light, the IR camera may photograph the user's eyes by using IR light reflected by the user's eyes. When the light emitter 1520 is the IR LED and the light receiver 1530 is the IR camera, the light emitter 1520 may emit IR light of planar light toward the user's eyes, and the light receiver 1530 may receive the IR light of the planar light reflected by the user's eyes.

Image analysis may be performed on a portion of the entire region of an eyeball image captured by the IR camera-based gaze tracking sensor, based on the set sensing region. The sensing region may be set as a region where the information related to the eyeball and gaze of the user, which is for detecting the gaze of the user, may be obtained from an eyeball image captured by the IR camera.

Sensor data of the IR camera-based gaze tracking sensor refers to raw data from IR light emitted by the IR LED, reflected by the user's eyes, and photographed by the IR camera, and the gaze tracking device 1000 may obtain the information related to the user's eyeball and gaze by analyzing the sensor data.

Figure 7A:
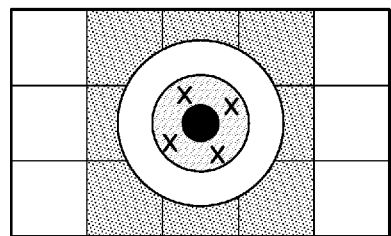
FIGS. 7A, 7B and 7C are views for explaining a method, performed by a camera-based gaze tracking sensor, of sensing the eyeball of a user to obtain pupil information and eye feature point information.
Figure 7B:
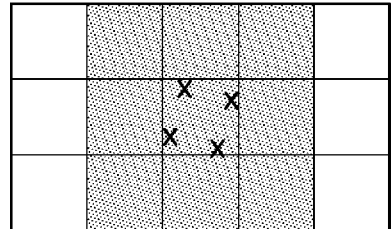
Figure 7C:
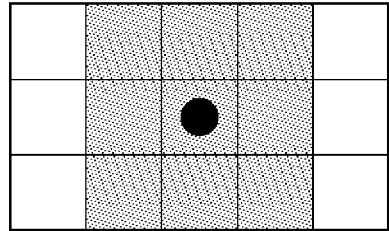

FIGS. 7A, 7B and 7C are views for explaining a method of sensing the eyeball of a user to obtain pupil information and eye feature point information, performed by a camera-based gaze tracking sensor.

FIG. 7A shows a user eyeball image captured by the IR camera.

Referring to FIG. 7A, in a camera-based gaze tracking method, information related to the user's eyeball and gaze may be acquired by pixel-analyzing an eyeball image captured by the IR camera.

It is assumed that the shape of the iris is a circle, and the iris is detected using a variable template. Because a glint exists in an iris region and has the characteristic of having a pixel value of a highest brightness, the glint may be detected by performing binarization in the iris region. Because the pupil is partially blocked depending on the location of the glint and thus it is difficult to search for a correct pupil using a circle or ellipse detection method, the location of the pupil may be detected by using the location information of the glint.

In the camera-based gaze tracking method, a portion having a brightness less than or equal to a reference value may be determined as a pupil, and a portion having a brightness greater than or equal to the reference value may be determined as a glint, by pixel-analyzing an eyeball image captured by the IR camera. According to an example embodiment, the reference value may be a predetermined value. Referring to FIG. 7B, by analyzing the eyeball image of FIG. 7A, a portion having brightness equal to or greater than the predetermined brightness may be identified as a glint feature point.

According to an example embodiment, a method of detecting a glint feature point by using the camera-based gaze tracking sensor may include the gaze tracking device obtaining an image of the user's eye region using the IR camera, removing noise, generating a valley map, detecting the iris by (applying a variable template, extracting the iris region, performing binarization, performing labeling, and detecting the glint.

Referring to FIG. 7C, by analyzing the eyeball image of FIG. 7A, a portion having brightness equal to or less than the predetermined brightness may be identified as the location of the pupil.

According to an example embodiment, a method of detecting the pupil by using the camera-based gaze tracking sensor may include obtaining an image of the user's eye region using the IR camera, removing noise in the obtained image, performing binarization, performing erosion/dilation operations, performing labeling operation and detecting the pupi.

When eyeball image analysis is performed using an artificial intelligence model and the amount of data to be processed increases, processing speed and performance are degraded. Accordingly, there is a need to determine an optimal eyeball photographing region or eyeball image processing region for obtaining information related to the user's eyeball and gaze.

Figure 8A:
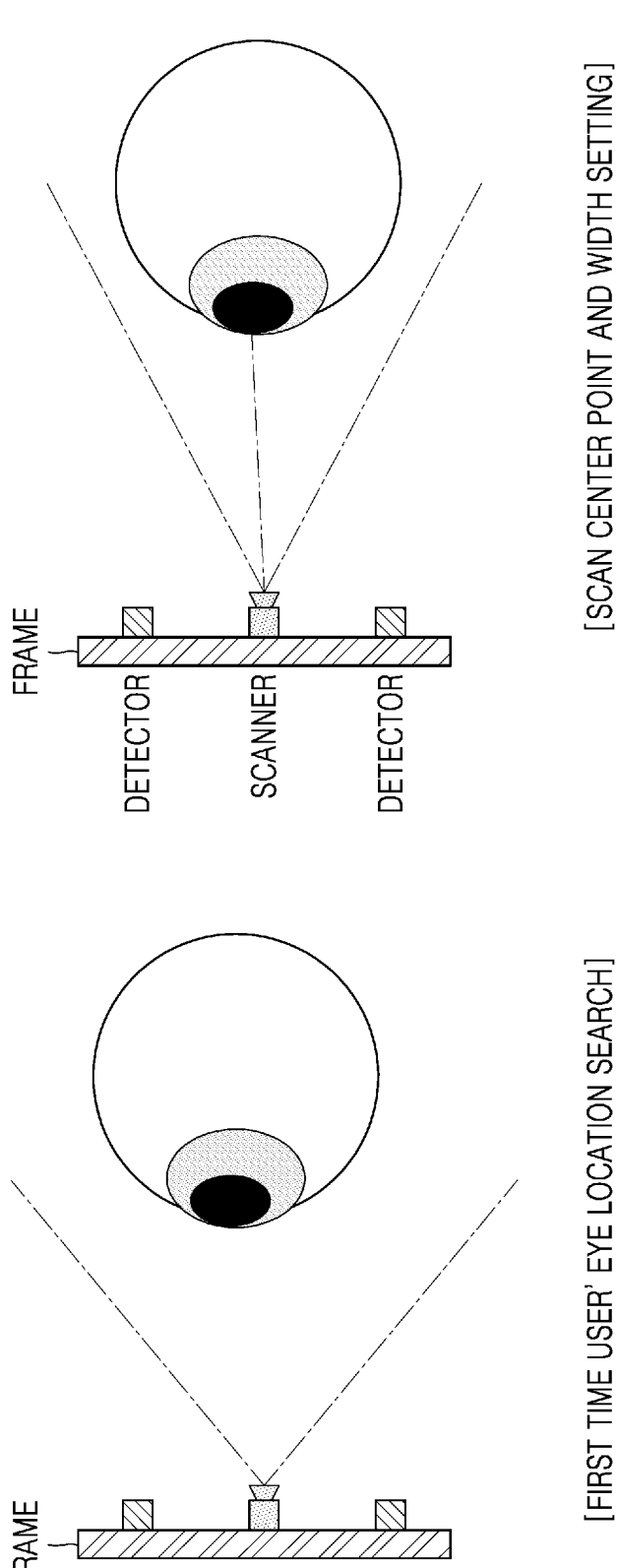
FIGS. 8A and 8B are views for explaining a method of determining a sensing region in a gaze tracking method according to an example embodiment of the disclosure.
Figure 8B:
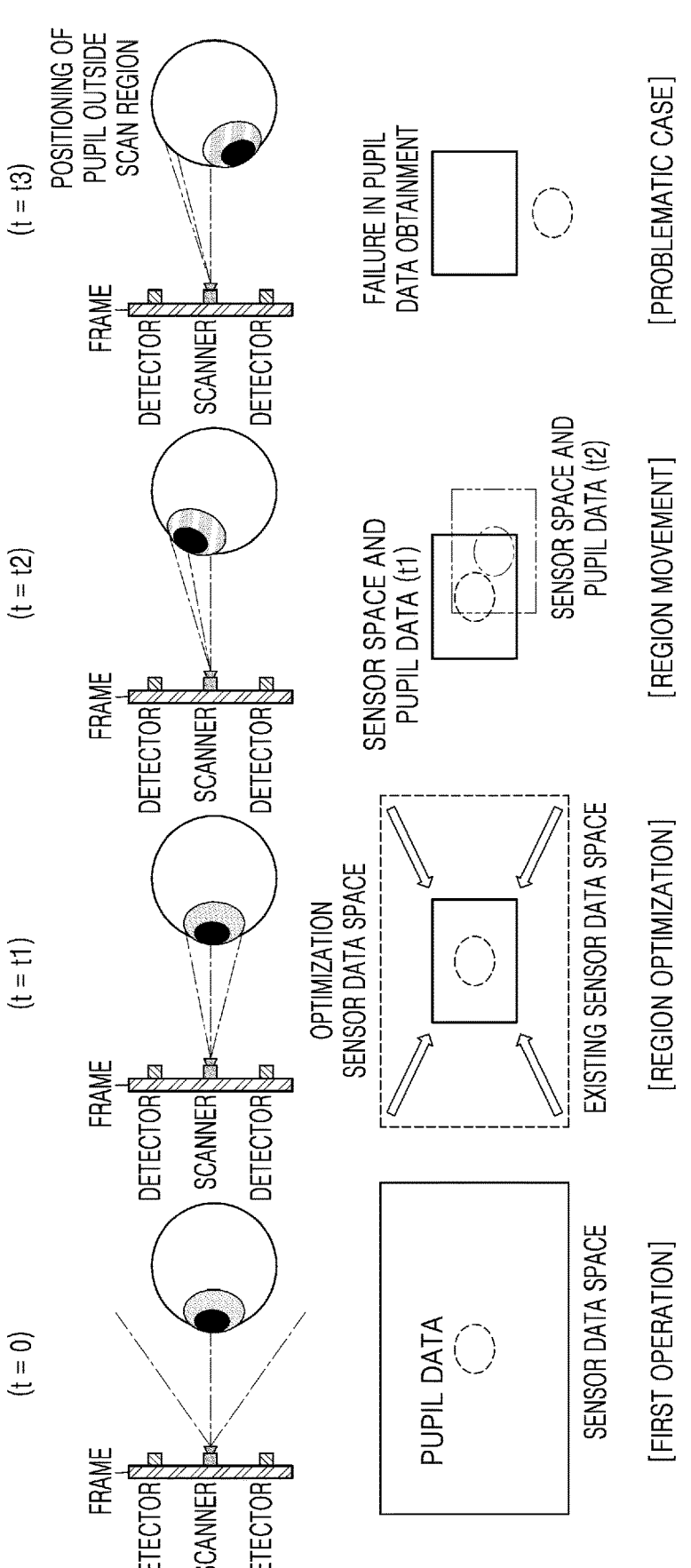

FIGS. 8A and 8B are views for explaining a method of determining a sensing region in a gaze tracking method according to an example embodiment of the disclosure.

In order to determine a sensing region for sensing the user's eyes, the gaze tracking sensor searches for the user's eye location in an initial sensing process. In order to search for the user's eye location, an electronic device (e.g., an AR device) including the gaze tracking sensor may request the user to maintain a state of gazing the front for a predetermined period of time. While the user is maintaining a fixed gaze, the gaze tracking sensor may sense the user's eyes with a maximum sensable range (e.g., a maximum scan angle supportable by hardware).

Referring to FIG. 8A, when information about the user's eye feature points is obtained through initial sensing, the scanner-based gaze tracking sensor may determine a 'central direction' based on the eye feature points, and may perform gaze tracking by scanning the user's eyeball in a fixed scan range. The 'central direction' may be determined so that the eye feature points are located close to the scan center point as possible.

Referring to FIG. 8B, (at time t=0), the scanner-based gaze tracking sensor may obtain pupil data information in a two-dimensional (2D) sensor data space by scanning the entire range of the user's eyes when first being worn, and may determine an optimized sensor data space based on the pupil data information.

The sensor data space of a maximum range obtained through initial sensing may be optimized (at time t=t1) due to reduction based on the pupil data information, and the gaze may be tracked by detecting the movement of the pupil and changing a scan region (at time t=t2). However, when the scan region is changed by detecting the movement of the pupil within the sensing region, there is no clue for determining the scan region after when gaze tracking fails (at time t=t3) due to causes such as eye blinking or sensor noise (for example, when the pupil is located outside the scan region), and thus the gaze tracking sensor needs to again sense the user's eyes in the maximum sensable range to thereby obtain information related to the user's eye feature points.

Eye tracking may fail due to various factors while using the electronic device, and, when the sensing region is determined in the same way as shown in FIGS. 8A and 8B, the first sensing needs to be performed every time the user wears the electronic device including the gaze tracking sensor. Moreover, because the sensing region may not be updated while the user is using the electronic device, sensing for searching for the user's eye location needs to be performed again in order to update the sensing region.

Figure 9A:
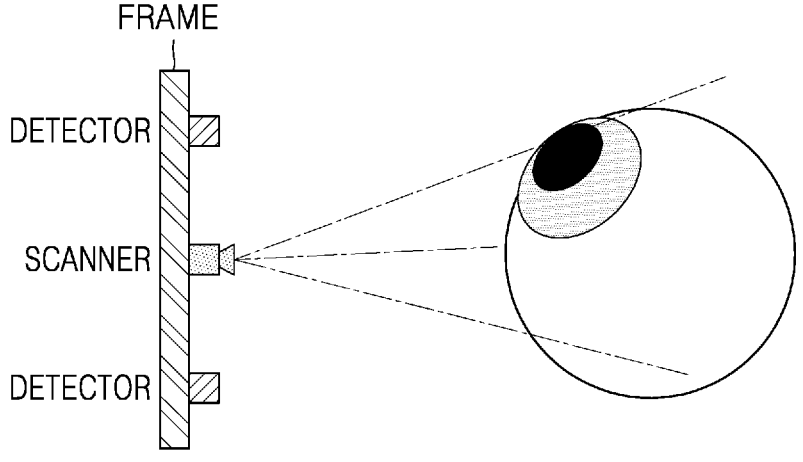
FIGS. 9A, 9B and 9C are views for explaining a case where gaze tracking fails in a gaze tracking method according to an example embodiment of the disclosure.
Figure 9B:
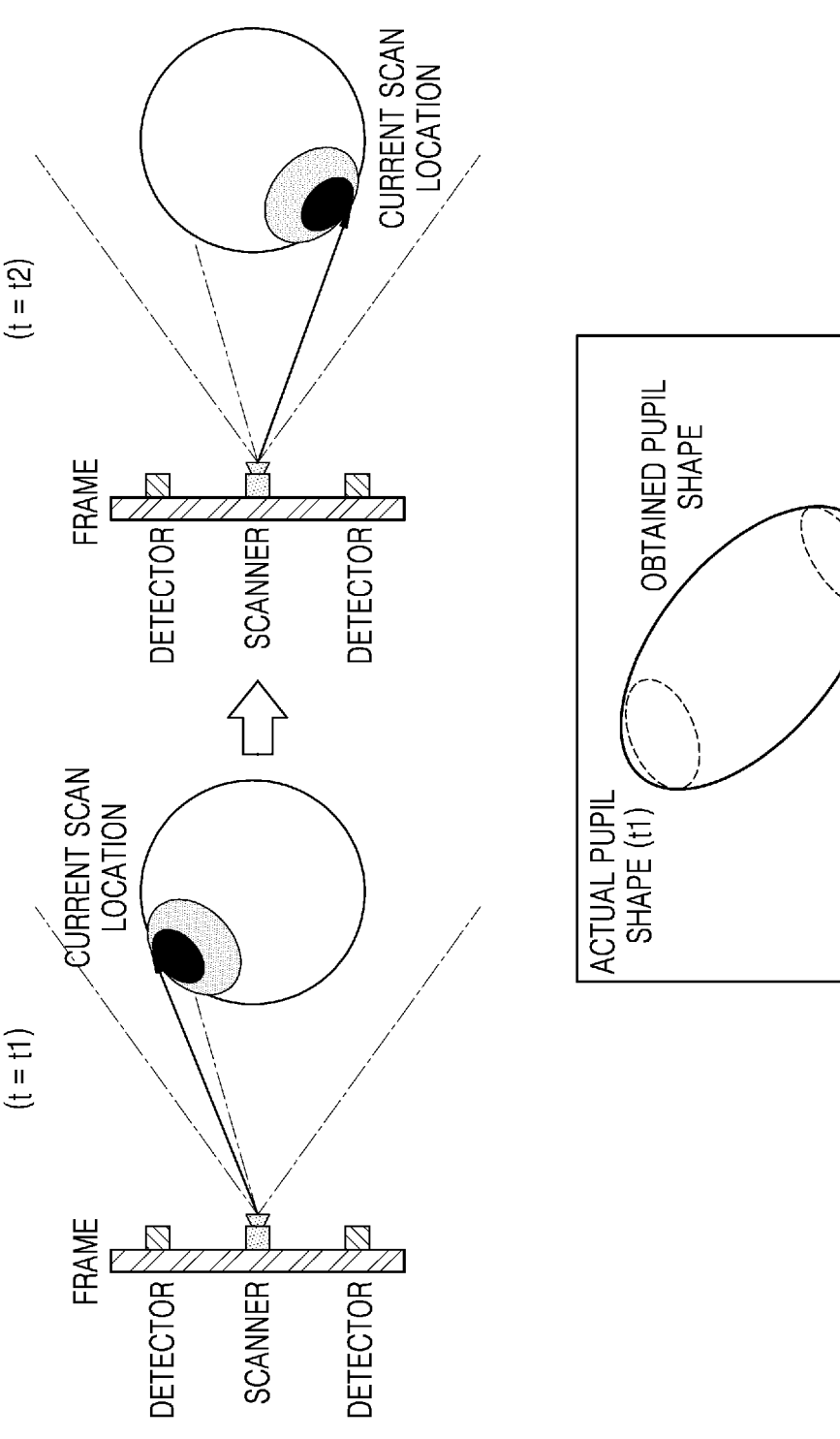
Figure 9C:
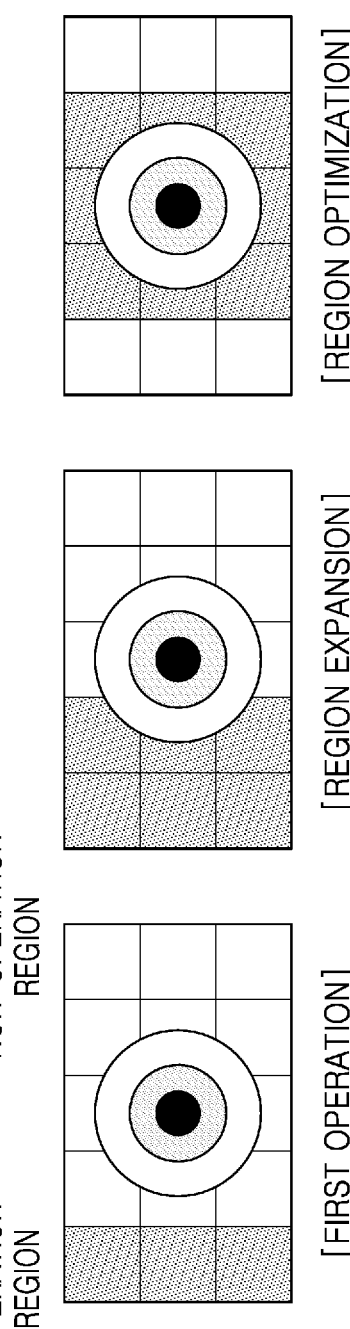

FIGS. 9A, 9B and 9C are views for explaining a case where gaze tracking fails in a gaze tracking method according to an example embodiment of the disclosure.

Referring to FIG. 9A, a portion of the pupil of the user's eye may be located outside the scan region of the scanner, that is, the sensing region, due to an incorrect sensing region setting. Such a phenomenon may occur because, when the sensing region (e.g., a scan angle of the scanner) is narrow, the pupil moves out of the sensing region due to the rotation of the eye. Alternatively, such a phenomenon may occur because, when relative locations of the gaze tracking sensor and the eye are changed due to slippage of the electronic device, the location of the pupil moves out of the sensing region.

Referring to FIG. 9B, a result of scanning the pupil of the user's eye may be distorted due to an incorrect sensing region setting. In such a phenomenon, when the sensing region (e.g., the scanning angle of the scanner) is wide, the time for sensing becomes longer, and, when the pupil moves rapidly within one scan period, the shape of the pupil may not be properly obtained. For example, it is assumed that the pupil located on the upper side at a time point t1 within one scan period rotates rapidly and is located on the lower side at a time point t2. In this case, an actual pupil shape is two small ellipses that look upward at the time point t1 and look downward at the time point t2, as indicated by dotted lines, but the pupil shape sensed by the gaze tracking sensor within the scan period including the time points t1 and t2 is obtained as a large oval shape indicated by a solid line, the large oval shape including the top and the bottom.

Referring to FIG. 9C, the camera-based gaze tracking sensor may perform gaze tracking by operating only a portion of an image sensor of the camera. In detail, when the gaze tracking sensor performs initial sensing and does not obtain a sensing result of the outer shape of the eye in the initial sensing, the gaze tracking sensor may extend the sensing region and thus re-attempt obtainment of eye outer shape information. When the eye outer shape is successfully obtained by expanding the sensing region, a sensing region necessary for gaze tracking may be optimized based on the obtained eye outer shape. However, the camera-based gaze tracking sensor requires a relatively wide operation region to check the appearance of the eye, and, when the operation region becomes wider, the amount of data for image processing increases, and thus inference and learning performance of an AI model for gaze tracking is reduced.

Figure 10:
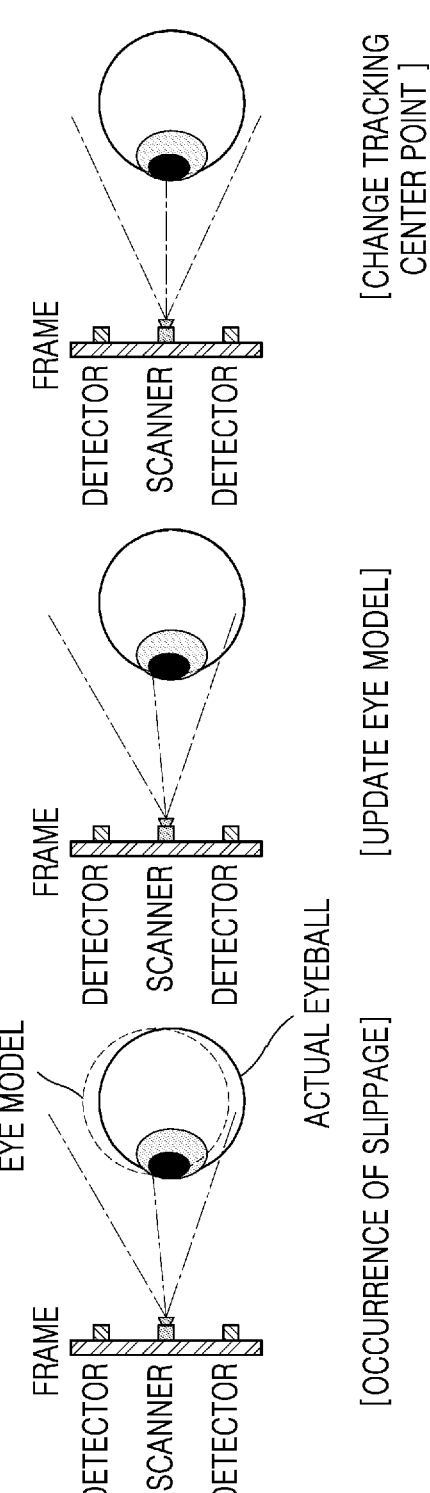
FIG. 10 is a view for explaining a method of determining a scan region in a gaze tracking method according to an example embodiment of the disclosure.

FIG. 10 is a view for explaining a method of determining a scan region in a gaze tracking method according to an example embodiment of the disclosure.

Referring to FIG. 10, in the gaze tracking method according to an example embodiment of the disclosure, when the user's eyeball moves during sensing for gaze tracking by the gaze tracking sensor, the eye model may be updated according to the eye movement, and the sensing region of the gaze tracking sensor may be changed by changing a gaze tracking center point based on the updated eye model.

As described above, when the location of the gaze tracking sensor is changed due to slippage of the electronic device on which the gaze tracking sensor is mounted, the user's eyeball location, which is determined in a relative relationship with the location of the gaze tracking sensor, is moved. Accordingly, when the pupil is not located within the sensing region, the gaze tracking sensor fails to track the gaze. According to a related art sensing method, the gaze tracking sensor need to perform initial sensing again with the maximum sensable range to obtain information about the user's eyeball. In addition, because it is impossible to obtain information on the user's eyeball and perform sensing for changing the sensing region, during gaze tracking, gaze tracking needs to be stopped, the information about the user's eyeball needs to be obtained, and then gaze tracking needs to be performed again.

However, according to an example embodiment of the disclosure, because the electronic device secures the user's eye model, when it is identified that the user's eyeball has moved, the user's eye model may be updated according to the eyeball movement, and the center point of the gaze tracking (e.g., the center direction of the pupil) may be moved based on the updated user's eye model, whereby the sensing region of the gaze tracking sensor may be changed.

Therefore, in the gaze tracking method according to an example embodiment of the disclosure, even when the user's gaze tracking fails, the sensing coverage of the gaze tracking sensor may be determined using the updated eye model, whereby the sensing coverage of the gaze tracking sensor may be determined without a separate scan. Moreover, the sensing region may be changed in real time based on information obtained during gaze tracking.

Figure 11:
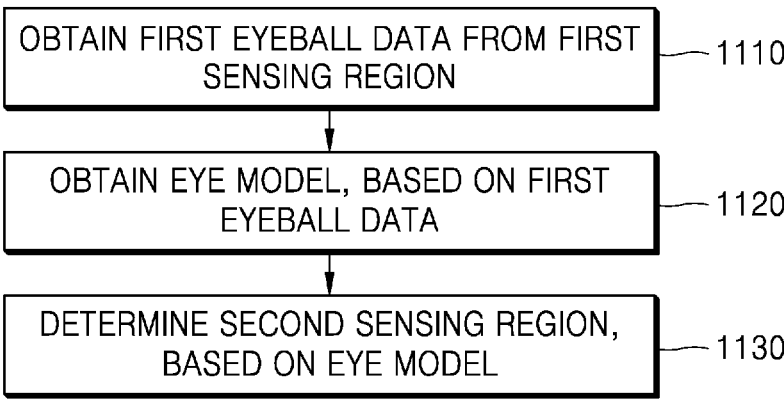
FIG. 11 is a flowchart of a method of determining a sensing region for gaze tracking, according to an example embodiment of the disclosure.

FIG. 11 is a flowchart of a method of determining a sensing region for gaze tracking, according to an example embodiment of the disclosure.

When the user of the gaze tracking device 1000 newly mounts the gaze tracking device 1000, because the gaze tracking device 1000 has no information for tracking the user's gaze, the gaze tracking device 1000 may perform initial sensing for detecting a user's gaze when it is identified that the user of the gaze tracking device 1000 newly mounts the gaze tracking device 1000.

According to an example embodiment of the disclosure, sensing for user gaze detection performed by the gaze tracking device 1000 may refer to a series of processes of emitting IR light toward the user's eyeball by using the light emitter 1520 of the sensor 1510 of the gaze detection module 1500 and receiving IR light reflected by the user's eyeball by using the light receiver 1530 to obtain sensor data including information related to the user's eyeball and gaze.

During initial sensing, the gaze tracking device 1000 may provide a user interface (e.g., displayed on a display or a voice is output) for requesting the user of the gaze tracking device 1000 to maintain the gaze fixed to the front for a predetermined period of time or to move the eyeball in a specific direction.

A sensing region for the initial sensing may be determined based on an initial setting value set in the gaze tracking device 1000 or may be determined as a maximum range in which the gaze detection module 1500 may operate.

As described above, as the sensing region for user gaze tracking increases, even when an external factor (e.g., noise caused by external light or pupil occlusion caused by blinking of the user's eyes) occurs, the possibility of success in tracking the user's gaze increases. Thus, initial sensing is generally performed in a wide range as possible in order to obtain stable information. According to an example embodiment of the disclosure, when sensor data including information on the user's eyeball and gaze is obtained through initial sensing, the gaze tracking device 1000 may obtain a 3D eye model of the user, based on the obtained sensor data, and determine a subsequent sensing region so that all of the user's eye feature points may be included.

The 3D eye model 1741 is generated based on the features related to the user's eyeball and gaze obtained by the eye feature detection module 1730 and the location of the user's eye pupil obtained by the pupil location detection module 1731. For example, the processor 1100 may execute the gaze determination module 1740 to 3D-model the eyeball of the user based on the locations of pupil feature points of the user's eyes, the locations of glint feature points of the user's eyes, and the location of the pupil detected by the eye feature detection module 1730.

In this case, the subsequent sensing region determined through the initial sensing is referred to as a first sensing region, and the sensing region may include information about a sensing center point and sensing coverage (e.g., an angle).

In operation 1110, the gaze tracking device 1000 may obtain first eyeball data from the first sensing region of the gaze tracking sensor.

According to an example embodiment of the disclosure, the first sensing region may refer to a sensing region determined through initial sensing, and the gaze tracking sensor may emit IR light toward the first sensing region of the user's eyeball by using the light emitter 1520 of the AR device 1000 and receive IR light reflected by the user's eyeball by using the light receiver 1530 to obtain the first eyeball data including information related to the user's eyeball.

The eyeball data refers to 2D sensor data including information related to the user's eyeball and gaze obtained from the gaze tracking sensor, and may include at least one of information about the location of the glint feature point of the user's eyeball, the size and location of the eyeball, the size and location of the pupil, the size and location of the iris, and the size and location of the cornea.

In operation 1120, the gaze tracking device 1000 may obtain an eye model, based on the first eyeball data obtained by the gaze tracking sensor.

The sensor data obtained by the gaze tracking sensor may refer to 2D data in which information about the eyeball in a 3D space is projected onto a 2D image space, and depth information corresponding to the z-axis (distance between the gaze tracking sensor and the user's eyeball) may be obtained by analyzing reception data of a plurality of light receivers included in the gaze detection module 1510. According to the above-described relationship, actual eyeball information in the 3D space may be obtained by unprojecting the sensor data.

According to an example embodiment of the disclosure, when an existing eye model exists, the gaze tracking device 1000 may obtain an eye model for detecting the user's gaze, by updating the existing eye model.

When the relative positions of the user's eyes and the AR device are changed or the user's eyeballs are rotated while the user of the gaze tracking device 1000 is using the gaze tracking device 1000, an accurate gaze detection result may not be obtained with the existing eye model. Accordingly, the AR device may periodically update the eye model for detecting the user's gaze or create a new eye model, based on the periodically obtained sensor data.

The 3D model space may be created by obtaining an eye model E by using real eyeball information in the 3D space and updating the eye model.

In operation 1130, the gaze tracking apparatus 1000 may determine a second sensing region based on the eye model.

According to an example embodiment of the disclosure, the gaze tracking device 1000 may obtain the user's gaze information by applying second sensor data including information related to the user's eye and gaze in the second sensing region to the 3D eye model.

The user's gaze information, which is information related to the user's gaze, may be created by analyzing the sensor data and may include information about, for example, a location of the user's pupil, a location of a pupil central point, a location of the user's iris, centers of the user's eyes, locations of glint feature points of the user's eyes, a gaze point of the user, a gaze direction of the user, etc., but the disclosure is not limited thereto. The gaze direction of the user may be, for example, a direction of the user's gaze from the center of the user's eyes toward the gaze point at which the user gazes. For example, the gaze direction of the user may be represented by a vector value from the center of the user's left eye toward the gaze point and a vector value from the center of the user's right eye toward the gaze point, but the disclosure is not limited thereto.

According to an example embodiment of the disclosure, the gaze tracking device 1000 may determine the second sensing region, based on a result of comparing data obtained by applying the first sensor data to the 3D eye model with data obtained by unprojecting the first sensor data onto a 3D space.

According to an example embodiment of the disclosure, the gaze tracking device 1000 may determine the second sensing region, based on a pupil center difference obtained by unprojecting information about the center of the pupil of the user's 3D eye model and the center of the pupil included in the first sensor data onto the 3D space, a ratio of the pupil size (radius) obtained by unprojecting information about the pupil size (radius) of the user's 3D eye model and the pupil size (radius) included in the first sensor data onto the 3D space, and a glint feature point location difference obtained by unprojecting information about the location of the glint feature point of the user's 3D eye model and the glint feature point included in the first sensor data.

Figure 12:
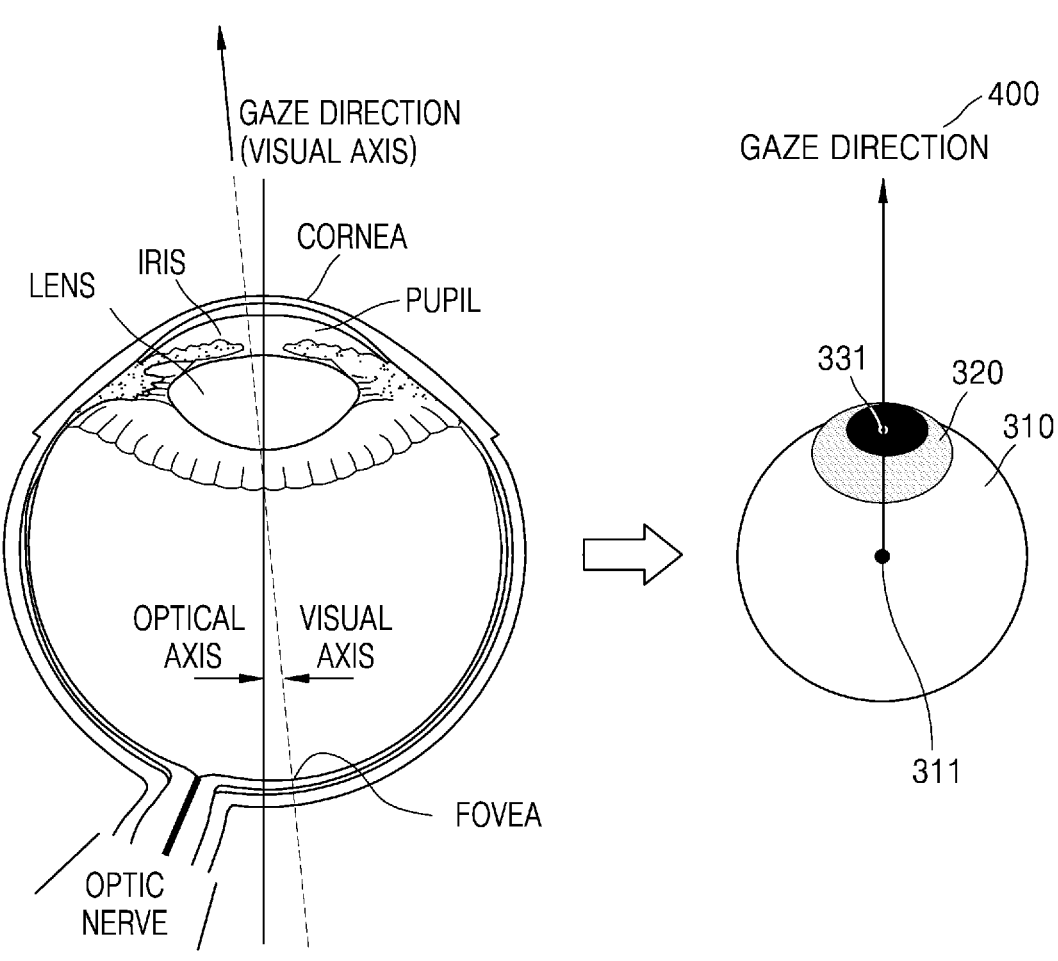
FIG. 12 shows the structure of the eyeball of a human and a simplified structure of the eyeball.

FIG. 12 shows the structure of the eyeball of a human and a simplified structure of the eyeball.

Referring to FIG. 12, in the structure of the eyeball, the fovea is a portion on which light passes vertically through the respective centers of the cornea and the lens and lands, and the direction of the gaze refers to a visual axis passing from the fovea to the center of the lens. A line passing through the pupil from the rotational center of the eyeball is called an optical axis, the angle between the visual axis, which is the direction of the gaze, and the optical axis is called a kappa angle, and the visual axis is tilted from the optical axis by about 5 degrees horizontally inward and about 1 degree vertically downward in the central direction of the pupil.

Because it is difficult to obtain actual data for each element constituting the eyeball through image analysis, gaze tracking data is obtained by using an eye model or through correction according to users.

The human eye is simply expressed as two spheres with different curvatures overlapping each other, in which a portion of a second eyeball protruding from a first sphere corresponding to an eyeball 310 may be represented as a cornea 320 and a portion of the front part of the second sphere may be represented as a pupil 330.

In the simplified eye model, gaze tracking refers to obtaining a vector heading from a center 311 of the eyeball toward a center point 331 of the pupil, that is, a gaze vector 400. Tracking the user's gaze may be implemented by tracking and measuring eyeball movements.

However, a detailed gaze tracking method may vary according to applied eye models and gaze tracking algorithms.

Figure 13:
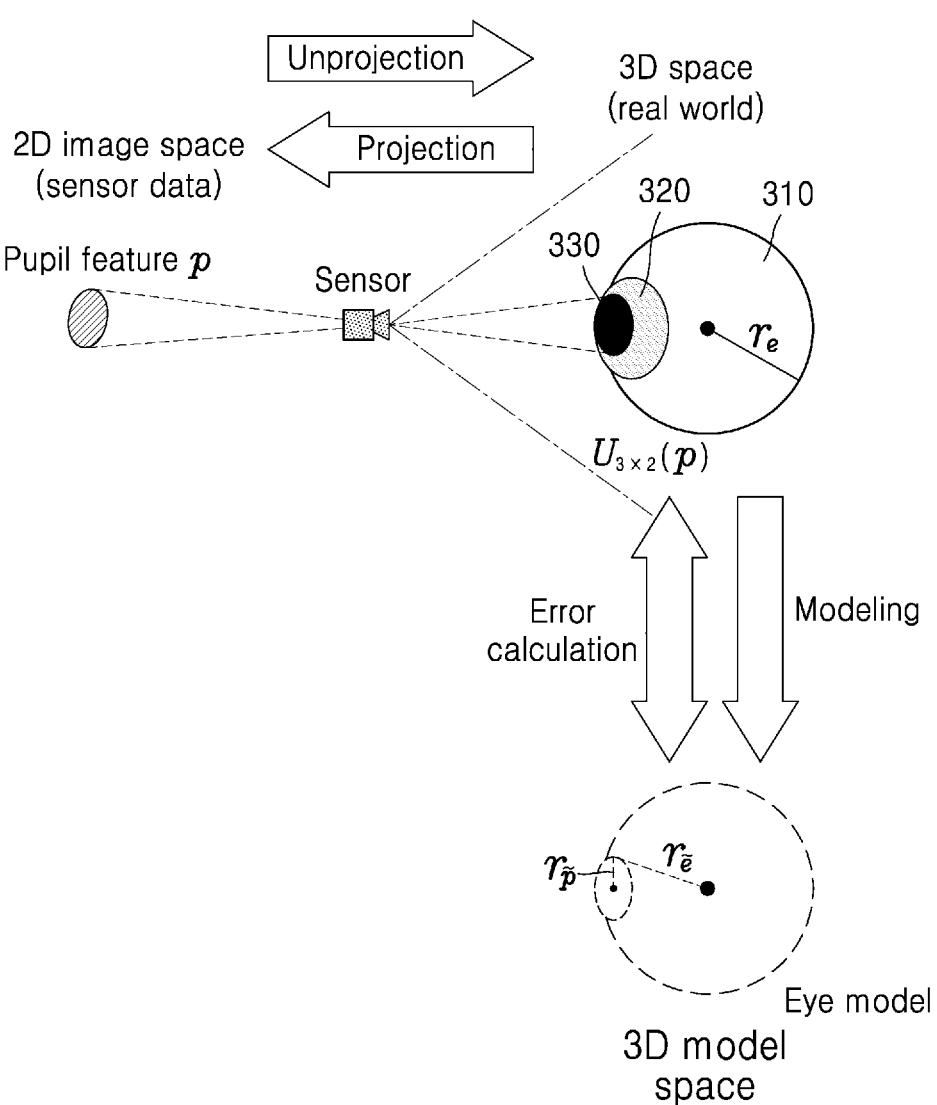
FIG. 13 is a diagram for explaining an eye model and a method of updating the eye model and determining a sensing region, according to an example embodiment of the disclosure.

FIG. 13 is a views for explaining an eye model and a method of updating the eye model and determining a sensing region, according to an example embodiment of the disclosure.

Referring to FIG. 13, the sensor data obtained by the gaze tracking sensor may refer to 2D data in which information about the eyeball in a 3D space is projected onto a 2D image space, and depth information corresponding to the z-axis (distance between the gaze tracking sensor and the user's eyeball) may be obtained by analyzing reception data of a plurality of light receivers included in the gaze detection module 1510. According to the above-described relationship, actual eyeball information in the 3D space may be obtained by unprojecting the sensor data.

The 3D model space may be created by obtaining an eye model E by using real eyeball information in the 3D space and updating the eye model.

Hereinafter, in order to explain eyeball data in each space, sensor data in a 2D plane is displayed using $(u, v)$ coordinates, and eyeball information in a 3D space obtained by unprojecting the sensor data is displayed using $(x, y, z)$ coordinates.

As described above, when the user wears the gaze tracking device 1000 for the first time, the gaze tracking device 1000 may operate the gaze tracking sensor in an initial sensing region (e.g., a sensing central point direction $\overrightarrow{c_0}$ and a sensing angle $\theta_0$) to obtain eye feature point information of the user and determine a first sensing region (e.g., a sensing central point direction $\overrightarrow{c_1}$ and a sensing angle $\theta_1$). At this time, the initial sensing range (the sensing central point direction $\overrightarrow{c_0}$ and the sensing angle $\theta_0$) due to initial wearing of the gaze tracking device 1000 may be determined as a sensing center point direction according to factory default settings and a maximum sensing angle supportable by hardware. When it fails to identify feature points related to the user's eyeball and gaze from obtained initial sensor data, the gaze tracking device 1000 may operate to recommend the user to wear the gaze tracking device 1000 again and to sense the eyeball again.

The gaze tracking sensor may obtain the sensor data by performing gaze tracking in the determined first sensing region, the determined sensing center point direction $\overrightarrow{c_1}$ and the determined sensing angle $\theta_1$.

The sensor data may include a pupil radius $r_p$, a 2D pupil center location $(u_p{}^c, v_p{}^e)$, and at least one 2D glint feature point location $(u_g, v_g)$.

The sensor data may be converted into 3D data by a matrix $U_{3\times2}$ that unprojects the 2D plane into the 3D space. The gaze tracking device 1000 may unproject the 2D pupil center location $(u_p{}^c, v_p{}^c)$ to obtain a 3D pupil center location $(x_p, y_p, z_p)$, and may unproject the 2D glint feature point location $(u_g, v_g)$ to obtain a 3D glint feature point location $(x_g, y_g, z_g)$. The gaze tracking device 1000 may also obtain the pupil radius $r_p$ in 3D space, based on the 2D plane pupil radius data and the z-axis depth information obtained by the gaze tracking sensor.

To generalize this, when information related to the glint feature point in the 2D sensor data is g, and information related to the pupil in the 2D sensor data is p, information related to the glint feature point in the 3D space may be expressed as $U_{3\times2}(g)$, and information related to the pupil in the 3D space may be expressed as $U_{3\times2}(p)$. In this case, an unprojection matrix $U_{3\times2}$ may be determined based on the location of the eyeball, a location $(x_s, y_s, z_s)$ of the light emitter 1520 included in the gaze tracking device 1000, and a location of the light receiver 1530 included in the gaze tracking device 1000. The information related to the user's eyeball and gaze in the 3D space may further include an eyeball center location $(x_e, y_e, z_e)$. The gaze tracking device 1000 may determine the sensing region, based on a vector $\overrightarrow{c}$ representing a direction from the location $(x_s, y_s, z_s)$ of the sensor to a sensing center location and an angle $\theta$ representing sensing coverage. When the sensing center location is set to be the eyeball center location $(x_e, y_e, z_e)$, the vector $\overrightarrow{c}$ representing the direction to the sensing center location may be determined to be $(x_e, y_e, z_e)-(x_s, y_s, z_s)$. According to an example embodiment of the disclosure, a vector $\overrightarrow{v}$ passing through a pupil center location $(x_p, y_p, z_p)$ from the eyeball center location $(x_e, y_e, z_e)$ is a gaze vector, and is a gaze direction.

When the gaze tracking device 1000 fails to track the user's gaze while tracking the user's gaze, the gaze tracking device 1000 needs to change the sensing region of the gaze tracking sensor. However, in general, initial sensing for determining the sensing region and sensing for tracking the gaze operate separately from each other. Therefore, when gaze tracking fails, there is no clue for 'tracking', and thus it is impossible to change the sensing region immediately, and, when gaze tracking fails while tracking the user's gaze, a maximum range of sensing (initial sensing) for determining the sensing region needs to be performed again.

According to an example embodiment of the disclosure, the sensing region of the gaze tracking sensor may be changed/determined in real time by creating an eye model by using sensor data for gaze tracking and updating the eye model based on additionally obtained sensor data for gaze tracking. In addition, according to an example embodiment of the disclosure, because the eye model is created and updated based on user-specific eyeball and gaze information, when gaze tracking is performed based on the eye model according to an example embodiment of the disclosure, and the sensing region is determined, gaze tracking performance may be improved.

Figure 14:
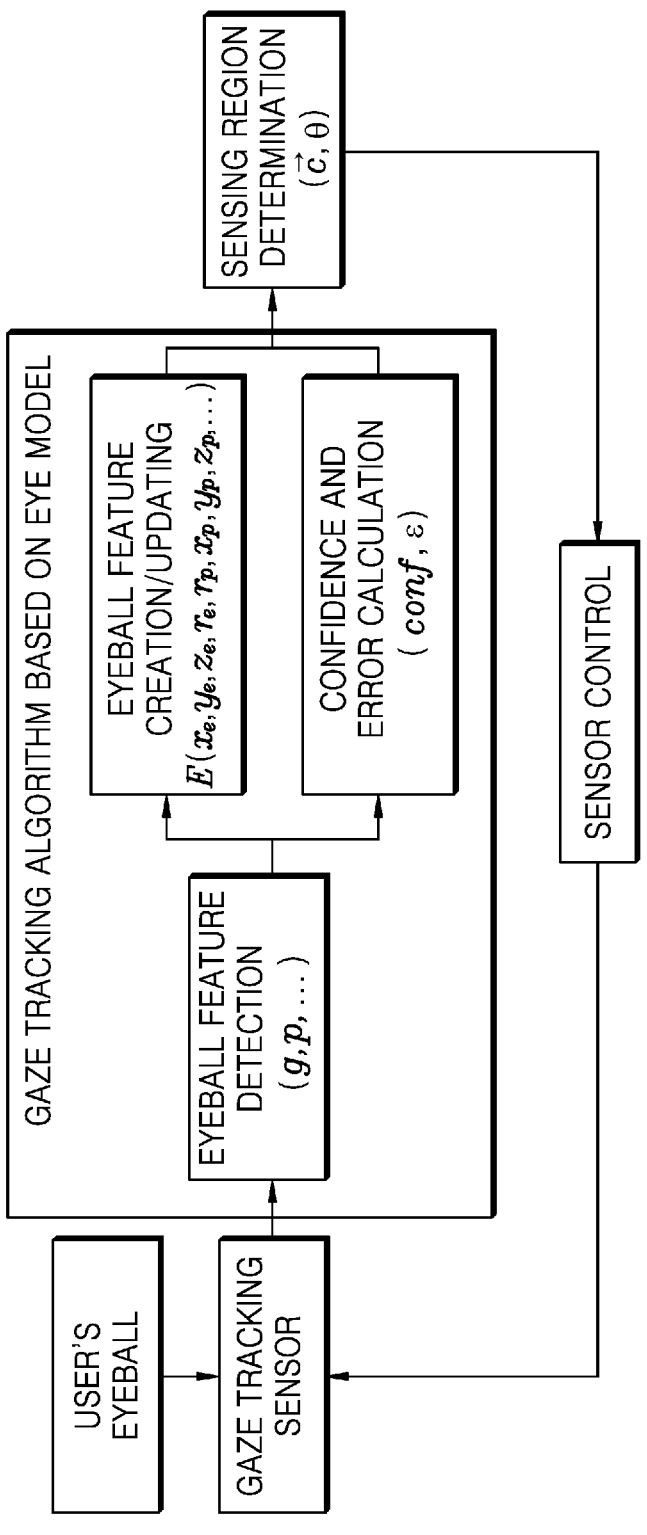
FIG. 14 is a block diagram illustrating an algorithm of obtaining an eye model and determining a sensing region for gaze tracking, according to an example embodiment of the disclosure.

FIG. 14 is a block diagram illustrating an algorithm of obtaining an eye model and determining a sensing region for gaze tracking, according to an example embodiment of the disclosure.

Referring to FIG. 14, the algorithm for obtaining the eye model and determining the sensing region, according to an example embodiment of the disclosure, obtains eye feature $(g, p, \ldots)$ information based on sensor data obtained by the gaze tracking sensor sensing the user's eyeball, obtains an eye model $E(x_e, y_e, z_e, r_e, r_p, x_p, y_p, z_p, \ldots)$ and reliability and error (conf, $\varepsilon$) of the eye model, based on the eye feature information, and determines a sensing region $(\overrightarrow{c}, \theta)$, based on the obtained eye model and the obtained reliability and error. In this case, the eye model is updated by reflecting the user's eye feature information when there is an existing eye model, and is created by reflecting the user's eye feature information when there is no previously-created eye model. In addition, the eye model may be separately created and managed for each user by reflecting user information.

The gaze tracking device equipped with the gaze tracking sensor according to an example embodiment of the disclosure may perform gaze tracking by controlling the sensor according to the determined sensing region.

When 3D data is obtained by unprojecting the 2D sensor data, the gaze tracking device 1000 may obtain information related to the glint feature point and information related to the pupil on the 3D eye model by applying the obtained 3D data to the 3D eye model.

When the sensor data is obtained from the gaze tracking sensor, the gaze tracking device 1000 may identify feature points (e.g., $g, p, \ldots$) related to the user's eyeball and gaze from the sensor data, and may create a 3D user eye model, based on the feature points related to the user's eyeball and gaze. The 3D eye model according to an example embodiment of the disclosure may be defined as $E(x_e, y_e, z_e, r_e, r_p, z_p, y_p, z_p, \ldots)$.

The gaze tracking sensor may obtain 2D sensor data $(g, p, \ldots)$ in a sensing region of the sensing center direction vector $\overrightarrow{c}$ and the sensing coverage $\theta$, and the gaze tracking device 1000 may obtain an eyeball radius $r_e$ in the 3D eye model, a pupil radius $r_{\tilde{p}}$, a 3D pupil center location $(x_{\tilde{p}}, y_{\tilde{p}}, z_{\tilde{p}})$ in the 3D eye model, and a location $(x_{\tilde{g}}, y_{\tilde{g}}, z_{\tilde{g}})$ of at least one glint feature point by applying, to the 3D eye model, 3D data obtained by unprojecting the 2D sensor data.

The gaze tracking device 1000 may obtain first sensor data by sensing the user's eyeball in the first sensing region (e.g., $\vec{c}_1$ and $\theta_1$).

The gaze tracking device 1000 may identify information (g, p, . . . ) about the feature points related to the user's eyeball and gaze from the first sensor data, and may update the 3D user eye model based on the feature points related to the user's eyeball and gaze.

According to an example embodiment of the disclosure, the gaze tracking device 1000 may update the 3D user eye model $E(x_e, y_e, z_e, r_e, r_p, x_p, y_p, z_p, . . . )$, based on the information (g, p, . . . ) about the feature points related to the user's eyeball and gaze from the first sensor data. When the 3D user eye model is not created in a previous stage, the gaze tracking device 1000 may newly create the 3D user eye model, based on the information (g, p, . . . ) about the feature points related to the user's eyeball and gaze from the first sensor data.

The gaze tracking device 1000 may obtain information ($\tilde{g}$, $\tilde{p}$, . . . ) about an eye feature point in the 3D model space by using the 3D user eye model E.

The gaze tracking device 1000 may obtain an error $\varepsilon = (\varepsilon_{pupilcenter}, \varepsilon_{pupilscale}, \varepsilon_{glint}, . . . )$ of the eye model, based on a difference between $U_{3\times2}$(g, p, . . . ) obtained by unprojecting the information (g, p, . . . ) about the feature points related to the user's eyeball and gaze and the information ($\tilde{g}$, $\tilde{p}$, . . . ) about the eye feature point in the 3D model space.

According to an example embodiment of the disclosure, $\varepsilon_{pupilcenter}$ refers to a difference between the center locations of the actual pupil in the 3D space and the pupil in the 3D model space, and is defined as follows.

$$\varepsilon_{pupilcenter} = U_{3\times2}(u_p{}^c, v_p{}^c) - (x_{\tilde{p}}, y_{\tilde{p}}, z_{\tilde{p}})$$

$\varepsilon_{pupilscale}$ refers to a ratio of the size (radius) of the actual pupil in the 3D space to the size (radius) of the pupil in 3D model space, and is defined as follows.

$$\varepsilon_{pupilscale} = r_p/r_{\tilde{p}}$$

$\varepsilon_{glint}$ refers to a difference between the location of an actual glint feature point and the location of the glint feature point in the 3D model space, and is defined as follows.

$$\varepsilon_{glint} = U_{3\times2}(u_g, u_g) - (x_{\tilde{g}}, y_{\tilde{g}}, z_{\tilde{g}})$$

The gaze tracking device 1000 may determine second sensing regions (e.g., $\vec{c}_2$ and $\theta_2$), based on an error $\varepsilon$ of the eye model E, which is eyeball data in the 3D model space, and eyeball data on the 3D space.

Thereafter, the gaze tracking device 1000 may repeat a process of obtaining second sensor data by sensing the user's eyeball in the second sensing region, updating the 3D user eye model based on the second sensor data, and performing a new sensing region based on the updated eye model.

Because the gaze tracking device 1000 performs sensing for tracking the user's gaze in real time and may use an eye model created and updated based on existing sensing data, the gaze tracking device 1000 may determine and change the sensing region in real time by using the eye model, even when the gaze tracking fails.

Figure 15:
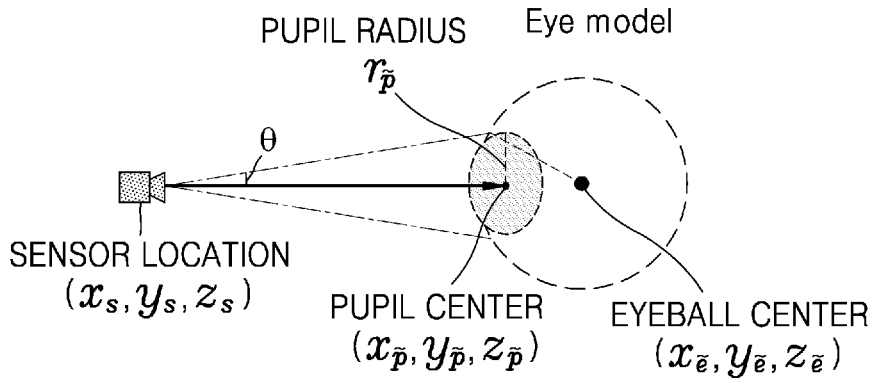
FIG. 15 is a view illustrating a sensing region of a gaze tracking sensor according to an example embodiment of the disclosure.

FIG. 15 is a view illustrating a sensing region of a gaze tracking sensor according to an example embodiment of the disclosure.

Referring to FIG. 15, the sensing region of the gaze tracking sensor may be determined based on information on the location of the sensor, information on the location of the pupil center, information on the sensing angle, and information on the radius of the pupil.

Referring to FIG. 15, a 3D location of the sensor is defined as $(x_s, y_s, z_s)$, a location of the pupil center in the 3D space is defined as $(x_p, y_p, z_p)$, and the radius of the pupil is defined as $r_p$, and the remaining variables follow the definition of FIG. 13.

In this case, a sensing direction may be determined as follows by correcting a positional error of the 3D eye model with a direction vector from the sensor toward the center of the eye.

$$\vec{c} = (x_e, y_e, z_e) - (x_s, y_s, z_s) + (\varepsilon_{pupilcenter} + \varepsilon_{glint})$$

In addition, sensing coverage $\theta$ is a minimum central angle of a cone including the area of the pupil, and may be determined as follows by correcting a pupil scaling error.

$$\theta = \tan^{-1}(r_p/|(x_p, y_p, z_p) - (x_s, y_s, z_s)|) * (\varepsilon_{pupilscale})$$

Figure 16:
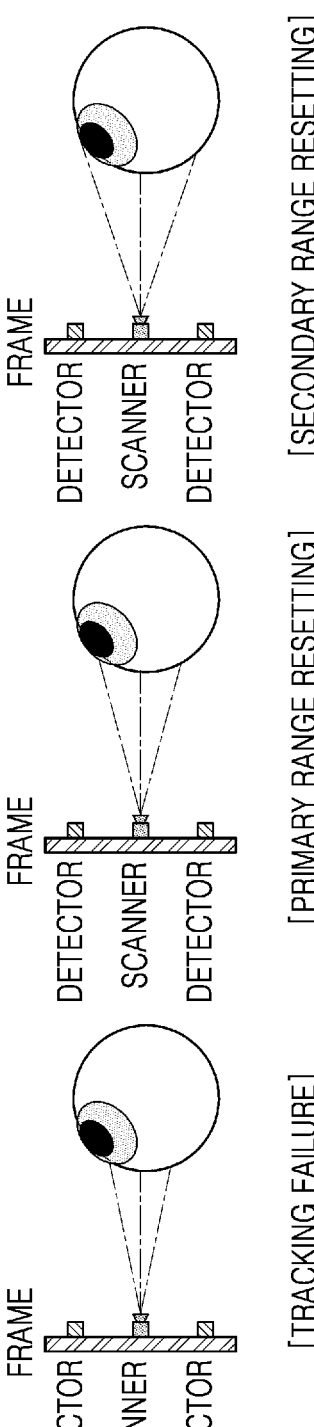
FIG. 16 is a view for explaining a method, performed by a gaze tracking sensor, of expanding a sensing region in stages when gaze tracking fails, according to an example embodiment of the disclosure.

FIG. 16 is a view for explaining a method, performed by a gaze tracking sensor, of expanding a sensing region in stages when gaze tracking fails, according to an example embodiment of the disclosure.

The gaze tracking device 1000 using a fixed eye model may fail gaze tracking due to, for example, a user's eye blinking or sensor noise. When the gaze tracking device 1000 fails gaze tracking, because there is clue for gaze tracking, tracking is impossible, and thus determination of the sensing region fails and the initial sensing for determining the sensing region needs to be performed.

The gaze tracking sensor according to an example embodiment of the disclosure may change the sensing region in real time by updating the eye model in real time based on gaze tracking sensor data.

Referring to FIG. 16, when the gaze tracking sensor according to an example embodiment of the disclosure fails gaze tracking due to a predetermined factor, the sensing region is made wider than an existing sensing region and is sensed, and, when gaze tracking fails even when the sensing region is widened, gradual expansion of the sensing region to a wider sensing region may be attempted. For example, when gaze tracking fails, the gaze tracking sensor may attempt to first obtain eyeball data by expanding the sensing region to the iris range of the current eye model, and, when the eyeball data is not obtained from an iris region, the gaze tracking sensor may attempt to obtain eyeball data by secondarily expanding the sensing region to the entire eyeball range of the current eye model.

According to an example embodiment of the disclosure, the gaze tracking sensor may attempt to expand the sensing region according to a preset range and a preset number of times, and, when the gaze tracking sensor fails eyeball data obtainment until a threshold number of times $n_{max}$, the gaze tracking sensor may perform sensing in a sensable maximum range (e.g., a maximum scan angle $\theta_{max}$ supportable by hardware) of the gaze tracking sensor.

The machine-readable storage medium may be provided as a non-transitory storage medium. The 'non-transitory storage medium' is a tangible device and only means that it does not contain a signal (e.g., electromagnetic waves). This term does not distinguish a case in which data is stored semi-permanently in a storage medium from a case in which data is temporarily stored. For example, the non-transitory storage medium may include a buffer in which data is temporarily stored.

According to an example embodiment of the disclosure, a method according to various disclosed embodiments may be provided by being included in a computer program product. Computer program products are commodities and thus may be traded between sellers and buyers. Computer program products are distributed in the form of device-readable storage media (e.g., compact disc read only memory (CD-ROM)), or may be distributed (e.g., downloaded or uploaded) through an application store or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

What is claimed is:

1. A method performed by a gaze tracking sensor, the method comprising:

determining a first sensing region of the gaze tracking sensor as a sensing region for obtaining eyeball data of a user;

obtaining first eyeball data from the first sensing region;

obtaining an eye model, based on the first eyeball data;

determining a second sensing region of the gaze tracking sensor, based on the eye model; and changing the sensing region of the gaze tracking sensor from the first sensing region to the second sensing region.

2. The method of claim 1, wherein the obtaining of the eye model comprises updating an existing eye model, based on the first eyeball data.

3. The method of claim 1, wherein the first eyeball data comprises at least one of:

information about locations of glint feature points of an eyeball of the user, a size and a location of the eyeball, a size and a location of a pupil of the user, a size and a location of an iris of the user, or a size and a location of a cornea of the user.

4. The method of claim 1, wherein the determining the second sensing region comprises:

comparing first data obtained by unprojecting first sensor data into a three-dimensional (3D) space with second data obtained by applying the first sensor data to the eye model; and determining the second sensing region based on a result of the comparing.

5. The method of claim 1, wherein the first sensing region and the second sensing region are determined based on a sensing center point and a sensing range.

6. The method of claim 1, wherein the first sensing region is determined based on eyeball data obtained in a maximum range that the gaze tracking sensor is able to sense.

7. The method of claim 1, further comprising:

obtaining second eyeball data from the second sensing region; and based on a gaze tracking failure using the second eyeball data, obtaining third eyeball data from a third sensing region, wherein the third sensing region has a same sensing center point as the second sensing region, and has a wider sensing coverage than the second sensing region.

8. The method of claim 1, wherein the first sensing region and the second sensing region are regions tracked by the gaze tracking sensor.

9. A gaze tracking device comprising:

at least one sensor comprising a light emitter and a light receiver;

a storage storing a program including at least one instruction; and at least one processor configured to execute the at least one instruction to:

determine a first sensing region of the at least one sensor as a sensing region for obtaining eyeball data of a user, obtain, from the at least one sensor, first eyeball data from the first sensing region, obtain an eye model, based on the first eyeball data, determine a second sensing region of the at least one sensor, based on the obtained eye model, and change the sensing region of the at least one sensor from the first sensing region to the second sensing region.

10. The gaze tracking device of claim 9, wherein the at least one processor is further configured to execute the at least one instruction to update an existing eye model based on the first eyeball data.

11. The gaze tracking device of claim 10, wherein the at least one processor is further configured to execute the at least one instruction to:

obtain second eyeball data from the second sensing region; and based on a gaze tracking failure using the second eyeball data fails, obtain third eyeball data from a third sensing region, and wherein the third sensing region has a same sensing center point as the second sensing region, and has a wider sensing coverage than the second sensing region.

12. The gaze tracking device of claim 9, wherein the first eyeball data comprises at least one of:

information about locations of glint feature points of an eyeball of the user, a size and a location of the eyeball, a size and a location of a pupil of the user, a size and a location of an iris of the user, or a size and a location of a cornea of the user.

13. The gaze tracking device of claim 9, wherein the at least one processor is further configured to execute the at least one instruction to:

compare first data obtained by unprojecting first sensor data into a three-dimensional (3D) space with second data obtained by applying the first sensor data to the eye model, and determine the second sensing region, based on a result of the comparison.

14. The gaze tracking device of claim 9, wherein the first sensing region and the second sensing region are determined based on a sensing center point and a sensing range.

15. The gaze tracking device of claim 9, wherein the first sensing region is determined based on eyeball data obtained in a maximum range that the at least one sensor is able to sense.

16. The gaze tracking device of claim 9, wherein the first sensing region and the second sensing region are regions tracked by the at least one sensor.

17. A non-transitory computer-readable recording medium having recorded thereon a computer program, which, when executed by a computer, performs the method of claim 1.

* * * * *